(12) United States Patent
Bollinger et al.

(10) Patent No.: US 8,245,508 B2
(45) Date of Patent: Aug. 21, 2012

(54) IMPROVING EFFICIENCY OF LIQUID HEAT EXCHANGE IN COMPRESSED-GAS ENERGY STORAGE SYSTEMS

(75) Inventors: Benjamin Bollinger, Windsor, VT (US); Patrick Magari, Plainfield, NH (US); Troy O. McBride, Norwich, VT (US)

(73) Assignee: SustainX, Inc., Seabrook, NH (US)

( * ) Notice: Subject to any disclaimer, the term of this patent is extended or adjusted under 35 U.S.C. 154(b) by 0 days.

(21) Appl. No.: 13/087,936

(22) Filed: Apr. 15, 2011

(65) Prior Publication Data

US 2011/0296821 A1 Dec. 8, 2011

Related U.S. Application Data

(63) Continuation of application No. 13/082,808, filed on Apr. 8, 2011.

(60) Provisional application No. 61/322,033, filed on Apr. 8, 2010, provisional application No. 61/361,096, filed on Jul. 2, 2010.

(51) Int. Cl.
*F16D 31/02* (2006.01)
(52) U.S. Cl. .............................. 60/407; 60/370; 60/415
(58) Field of Classification Search .................. 60/370, 60/371, 398, 407, 409, 415, 456
See application file for complete search history.

(56) References Cited

U.S. PATENT DOCUMENTS

| | | | |
|---|---|---|---|
| 114,297 A | 5/1871 | Ivens et al. |
| 224,081 A | 2/1880 | Eckart |
| 233,432 A | 10/1880 | Pitchford |
| 1,353,216 A | 9/1920 | Carlson |
| 1,635,524 A | 7/1927 | Aikman |
| 1,681,280 A | 8/1928 | Bruckner |
| 2,025,142 A | 12/1935 | Zahm et al. |
| 2,042,991 A | 6/1936 | Harris, Jr. |
| 2,141,703 A | 12/1938 | Bays |
| 2,280,100 A | 4/1942 | SinQleton |
| 2,280,845 A | 4/1942 | Parker |
| 2,404,660 A | 7/1946 | Rouleau |
| 2,420,098 A | 5/1947 | Rouleau |
| 2,486,081 A | 10/1949 | Weenen |
| 2,539,862 A | 1/1951 | Rushinq |
| 2,628,564 A | 2/1953 | Jacobs |
| 2,632,995 A | 3/1953 | Noe |
| 2,712,728 A | 7/1955 | Lewis et al. |
| 2,813,398 A | 11/1957 | Wilcox |
| 2,829,501 A | 4/1958 | Walls |

(Continued)

FOREIGN PATENT DOCUMENTS

BE 898225 3/1984

(Continued)

OTHER PUBLICATIONS

International Search Report and Written Opinion mailed May 25, 2011 for International Application No. PCT/US2010/027138, 12 pages.

(Continued)

*Primary Examiner* — Michael Leslie
(74) *Attorney, Agent, or Firm* — Bingham McCutchen LLP

(57) ABSTRACT

In various embodiments, efficiency of energy storage and recovery systems employing compressed air and liquid heat exchange is improved via control of the system operation and/or the properties of the heat-exchange liquid.

19 Claims, 7 Drawing Sheets

U.S. PATENT DOCUMENTS

| | | |
|---|---|---|
| 2,880,759 A | 4/1959 | Wisman |
| 3,041,842 A | 7/1962 | Heinecke |
| 3,100,965 A | 8/1963 | Blackburn |
| 3,236,512 A | 2/1966 | Caslav et al. |
| 3,269,121 A | 8/1966 | Ludwig |
| 3,538,340 A | 11/1970 | LanQ |
| 3,608,311 A | 9/1971 | Roesel, Jr. |
| 3,648,458 A | 3/1972 | McAlister |
| 3,650,636 A | 3/1972 | Eskeli |
| 3,672,160 A | 6/1972 | Kim |
| 3,677,008 A | 7/1972 | Koutz |
| 3,704,079 A | 11/1972 | Berlyn |
| 3,757,517 A | 9/1973 | RiQollot |
| 3,793,848 A | 2/1974 | Eskeli |
| 3,801,793 A | 4/1974 | Goebel |
| 3,803,847 A | 4/1974 | McAlister |
| 3,839,863 A | 10/1974 | Frazier |
| 3,847,182 A | 11/1974 | Greer |
| 3,895,493 A | 7/1975 | Riqollot |
| 3,903,696 A | 9/1975 | Carman |
| 3,935,469 A | 1/1976 | Haydock |
| 3,939,356 A | 2/1976 | Loane |
| 3,942,323 A | 3/1976 | Maillet |
| 3,945,207 A | 3/1976 | Hyatt |
| 3,948,049 A | 4/1976 | Ohms et al. |
| 3,952,516 A | 4/1976 | Lapp |
| 3,952,723 A | 4/1976 | Browning |
| 3,958,899 A | 5/1976 | Coleman, Jr. et al. |
| 3,986,354 A | 10/1976 | Erb |
| 3,988,592 A | 10/1976 | Porter |
| 3,988,897 A | 11/1976 | Strub |
| 3,990,246 A | 11/1976 | Wilmers |
| 3,991,574 A | 11/1976 | Frazier |
| 3,996,741 A | 12/1976 | HerberQ |
| 3,998,049 A | 12/1976 | McKinley et al. |
| 3,999,388 A | 12/1976 | Nystrom |
| 4,008,006 A | 2/1977 | Bea |
| 4,027,993 A | 6/1977 | Wolff |
| 4,030,303 A | 6/1977 | Kraus et al. |
| 4,031,702 A | 6/1977 | Burnett et al. |
| 4,031,704 A | 6/1977 | Moore et al. |
| 4,041,708 A | 8/1977 | Wolff |
| 4,050,246 A | 9/1977 | Bourquardez |
| 4,055,950 A | 11/1977 | Grossman |
| 4,058,979 A | 11/1977 | Germain |
| 4,075,844 A | 2/1978 | Schiferli |
| 4,089,744 A | 5/1978 | Cahn |
| 4,095,118 A | 6/1978 | Rathbun |
| 4,100,745 A | 7/1978 | Gyarmathy et al. |
| 4,104,955 A | 8/1978 | Murphy |
| 4,108,077 A | 8/1978 | Laing |
| 4,109,465 A | 8/1978 | Plen |
| 4,110,987 A | 9/1978 | Cahn et al. |
| 4,112,311 A | 9/1978 | Theyse |
| 4,117,342 A | 9/1978 | Melley, Jr. |
| 4,117,696 A | 10/1978 | Fawcett et al. |
| 4,118,637 A | 10/1978 | Tackett |
| 4,124,182 A | 11/1978 | Loeb |
| 4,126,000 A | 11/1978 | Funk |
| 4,136,432 A | 1/1979 | Melley, Jr. |
| 4,142,368 A | 3/1979 | Mantegani |
| 4,147,204 A | 4/1979 | Pfenninger |
| 4,149,092 A | 4/1979 | Cros |
| 4,150,547 A | 4/1979 | Hobson |
| 4,154,292 A | 5/1979 | Herrick |
| 4,167,372 A | 9/1979 | Tackett |
| 4,170,878 A | 10/1979 | Jahniq |
| 4,173,431 A | 11/1979 | Smith |
| 4,189,925 A | 2/1980 | Long |
| 4,197,700 A | 4/1980 | Jahniq |
| 4,197,715 A | 4/1980 | Fawcett et al. |
| 4,201,514 A | 5/1980 | Huetter |
| 4,204,126 A | 5/1980 | Diggs |
| 4,206,608 A | 6/1980 | Bell |
| 4,209,982 A | 7/1980 | Pitts |
| 4,220,006 A | 9/1980 | Kindt |
| 4,229,143 A | 10/1980 | Pucher |
| 4,229,661 A | 10/1980 | Mead et al. |
| 4,232,253 A | 11/1980 | Mortelmans |
| 4,237,692 A | 12/1980 | Ahrens et al. |
| 4,242,878 A | 1/1981 | Brinkerhoff |
| 4,246,978 A | 1/1981 | Schulz et al. |
| 4,262,735 A | 4/1981 | Courrege |
| 4,273,514 A | 6/1981 | Shore et al. |
| 4,274,010 A | 6/1981 | Lawson-Tancred |
| 4,275,310 A | 6/1981 | Summers et al. |
| 4,281,256 A | 7/1981 | Ahrens |
| 4,293,323 A | 10/1981 | Cohen |
| 4,299,198 A | 11/1981 | Woodhull |
| 4,302,684 A | 11/1981 | Gogins |
| 4,304,103 A | 12/1981 | Hamrick |
| 4,311,011 A | 1/1982 | Lewis |
| 4,316,096 A | 2/1982 | Syverson |
| 4,317,439 A | 3/1982 | Emmerling |
| 4,335,867 A | 6/1982 | Bihlmaier |
| 4,340,822 A | 7/1982 | Gregg |
| 4,341,072 A | 7/1982 | Clyne |
| 4,348,863 A | 9/1982 | Taylor et al. |
| 4,353,214 A | 10/1982 | Gardner |
| 4,354,420 A | 10/1982 | Bianchetta |
| 4,355,956 A | 10/1982 | Ringrose et al. |
| 4,358,250 A | 11/1982 | Payne |
| 4,367,786 A | 1/1983 | Hafner et al. |
| 4,368,692 A | 1/1983 | Kita |
| 4,368,775 A | 1/1983 | Ward |
| 4,370,559 A | 1/1983 | Langley, Jr. |
| 4,372,114 A | 2/1983 | Burnham |
| 4,375,387 A | 3/1983 | deFilippi et al. |
| 4,380,419 A | 4/1983 | Morton |
| 4,392,062 A | 7/1983 | Bervig |
| 4,393,752 A | 7/1983 | Meier |
| 4,411,136 A | 10/1983 | Funk |
| 4,416,114 A | 11/1983 | Martini |
| 4,421,661 A | 12/1983 | Claar et al. |
| 4,428,711 A | 1/1984 | Archer |
| 4,435,131 A | 3/1984 | Ruben |
| 4,444,011 A | 4/1984 | Kolin |
| 4,446,698 A | 5/1984 | Benson |
| 4,447,738 A | 5/1984 | Allison |
| 4,449,372 A | 5/1984 | Rilett |
| 4,452,046 A | 6/1984 | Valentin |
| 4,454,429 A | 6/1984 | Buonome |
| 4,454,720 A | 6/1984 | Leibowitz |
| 4,455,834 A | 6/1984 | Earle |
| 4,462,213 A | 7/1984 | Lewis |
| 4,474,002 A | 10/1984 | Perry |
| 4,476,851 A | 10/1984 | Brugger et al. |
| 4,478,553 A | 10/1984 | Leibowitz et al. |
| 4,489,554 A | 12/1984 | Otters |
| 4,491,739 A | 1/1985 | Watson |
| 4,492,539 A | 1/1985 | Specht |
| 4,493,189 A | 1/1985 | Slater |
| 4,496,847 A | 1/1985 | Parkings |
| 4,498,848 A | 2/1985 | Petrovsky |
| 4,502,284 A | 3/1985 | Chrisoqhilos |
| 4,503,673 A | 3/1985 | Schachle |
| 4,515,516 A | 5/1985 | Perrine et al. |
| 4,520,840 A | 6/1985 | Michel |
| 4,525,631 A | 6/1985 | Allison |
| 4,530,208 A | 7/1985 | Sato |
| 4,547,209 A | 10/1985 | Netzer |
| 4,574,592 A | 3/1986 | Eskeli |
| 4,585,039 A | 4/1986 | Hamilton |
| 4,589,475 A | 5/1986 | Jones |
| 4,593,202 A | 6/1986 | Dickinson |
| 4,619,225 A | 10/1986 | Lowther |
| 4,624,623 A | 11/1986 | Wagner |
| 4,648,801 A | 3/1987 | Wilson |
| 4,651,525 A | 3/1987 | Cestero |
| 4,653,986 A | 3/1987 | Ashton |
| 4,671,742 A | 6/1987 | Gyimesi |
| 4,676,068 A | 6/1987 | Funk |
| 4,679,396 A | 7/1987 | Heggie |
| 4,691,524 A | 9/1987 | Holscher |
| 4,693,080 A | 9/1987 | Van Hooff |
| 4,706,456 A | 11/1987 | Backe |
| 4,707,988 A | 11/1987 | Palmers |

| | | | | | |
|---|---|---|---|---|---|
| 4,710,100 A | 12/1987 | Laing et al. | 5,674,053 A | 10/1997 | Paul et al. |
| 4,735,552 A | 4/1988 | Watson | 5,685,155 A | 11/1997 | Brown |
| 4,739,620 A | 4/1988 | Pierce | 5,768,893 A | 6/1998 | Hoshino et al. |
| 4,760,697 A | 8/1988 | Heggie | 5,769,610 A | 6/1998 | Paul et al. |
| 4,761,118 A | 8/1988 | Zanarini et al. | 5,771,693 A | 6/1998 | Coney |
| 4,765,142 A | 8/1988 | Nakhamkin | 5,775,107 A | 7/1998 | Sparkman |
| 4,765,143 A | 8/1988 | Crawford et al. | 5,778,675 A | 7/1998 | Nakhamkin |
| 4,767,938 A | 8/1988 | Bervig | 5,794,442 A | 8/1998 | Lisniansky |
| 4,792,700 A | 12/1988 | Ammons | 5,797,980 A | 8/1998 | Fillet |
| 4,849,648 A | 7/1989 | Longardner | 5,819,533 A | 10/1998 | Moonen |
| 4,870,816 A | 10/1989 | Nakhamkin | 5,819,635 A | 10/1998 | Moonen |
| 4,872,307 A | 10/1989 | Nakhamkin | 5,831,757 A | 11/1998 | DiFrancesco |
| 4,873,828 A | 10/1989 | Laing et al. | 5,832,728 A | 11/1998 | Buck |
| 4,873,831 A | 10/1989 | Dehne | 5,832,906 A | 11/1998 | Douville et al. |
| 4,876,992 A | 10/1989 | Sobotowski | 5,839,270 A | 11/1998 | Jirnov et al. |
| 4,877,530 A | 10/1989 | Moses | 5,845,479 A | 12/1998 | Nakhamkin |
| 4,885,912 A | 12/1989 | Nakhamkin | 5,873,250 A | 2/1999 | Lewis |
| 4,886,534 A | 12/1989 | Castan | 5,901,809 A | 5/1999 | Berkun |
| 4,907,495 A | 3/1990 | Sugahara | 5,924,283 A | 7/1999 | Burke, Jr. |
| 4,936,109 A | 6/1990 | Longardner | 5,934,063 A | 8/1999 | Nakhamkin |
| 4,942,736 A | 7/1990 | Bronicki | 5,934,076 A | 8/1999 | Coney |
| 4,955,195 A | 9/1990 | Jones et al. | 5,937,652 A | 8/1999 | Abdelmalek |
| 4,984,432 A | 1/1991 | Corey | 5,971,027 A | 10/1999 | Beachley et al. |
| 5,056,601 A | 10/1991 | Grimmer | 6,012,279 A | 1/2000 | Hines |
| 5,058,385 A | 10/1991 | Everett, Jr. | 6,023,105 A | 2/2000 | Youssef |
| 5,062,498 A | 11/1991 | Tobias | 6,026,349 A | 2/2000 | Heneman |
| 5,107,681 A | 4/1992 | Wolfbauer, III | 6,029,445 A | 2/2000 | Lech |
| 5,133,190 A | 7/1992 | Abdelmalek | 6,073,445 A | 6/2000 | Johnson |
| 5,138,838 A | 8/1992 | Crosser | 6,073,448 A | 6/2000 | Lozada |
| 5,140,170 A | 8/1992 | Henderson | 6,085,520 A | 7/2000 | Kohno |
| 5,152,260 A | 10/1992 | Erickson et al. | 6,090,186 A | 7/2000 | Spencer |
| 5,161,449 A | 11/1992 | Everett, Jr. | 6,119,802 A | 9/2000 | Puett, Jr. |
| 5,169,295 A | 12/1992 | Stogner et al. | 6,132,181 A | 10/2000 | Mccabe |
| 5,182,086 A | 1/1993 | Henderson et al. | 6,145,311 A | 11/2000 | Cyphelly |
| 5,203,168 A | 4/1993 | Oshina | 6,148,602 A | 11/2000 | Demetri |
| 5,209,063 A | 5/1993 | Shirai et al. | 6,153,943 A | 11/2000 | Mistr, Jr. |
| 5,213,470 A | 5/1993 | Lundquist | 6,158,499 A | 12/2000 | Rhodes |
| 5,239,833 A | 8/1993 | Fineblum | 6,170,443 B1 | 1/2001 | Hofbauer |
| 5,259,345 A | 11/1993 | Richeson | 6,178,735 B1 | 1/2001 | Frutschi |
| 5,271,225 A | 12/1993 | Adamides | 6,179,446 B1 | 1/2001 | Sarmadi |
| 5,279,206 A | 1/1994 | Krantz | 6,188,182 B1 | 2/2001 | Nickols et al. |
| 5,296,799 A | 3/1994 | Davis | 6,202,707 B1 | 3/2001 | Woodall et al. |
| 5,309,713 A | 5/1994 | Vassallo | 6,206,660 B1 | 3/2001 | Coney et al. |
| 5,321,946 A | 6/1994 | Abdelmalek | 6,210,131 B1 | 4/2001 | Whitehead |
| 5,327,987 A | 7/1994 | Abdelmalek | 6,216,462 B1 | 4/2001 | Gray, Jr. |
| 5,339,633 A | 8/1994 | Fujii et al. | 6,225,706 B1 | 5/2001 | Keller |
| 5,341,644 A | 8/1994 | Nelson | 6,276,123 B1 | 8/2001 | Chen et al. |
| 5,344,627 A | 9/1994 | Fujii et al. | 6,327,858 B1 | 12/2001 | Negre et al. |
| 5,364,611 A | 11/1994 | Iijima et al. | 6,327,994 B1 | 12/2001 | Labrador |
| 5,365,980 A | 11/1994 | Deberardinis | 6,349,543 B1 | 2/2002 | Lisniansky |
| 5,375,417 A | 12/1994 | Barth | RE37,603 E | 3/2002 | Coney |
| 5,379,589 A | 1/1995 | Cohn et al. | 6,352,576 B1 | 3/2002 | Spencer et al. |
| 5,384,489 A | 1/1995 | Bellac | 6,360,535 B1 | 3/2002 | Fisher |
| 5,387,089 A | 2/1995 | Stogner et al. | 6,367,570 B1 | 4/2002 | Long, III |
| 5,394,693 A | 3/1995 | Plyter | 6,372,023 B1 | 4/2002 | Kiyono et al. |
| 5,427,194 A | 6/1995 | Miller | 6,389,814 B2 | 5/2002 | Viteri et al. |
| 5,436,508 A | 7/1995 | Sorensen | 6,397,578 B2 | 6/2002 | Tsukamoto |
| 5,448,889 A | 9/1995 | Bronicki | 6,401,458 B2 | 6/2002 | Jacobson |
| 5,454,408 A | 10/1995 | Dibella et al. | 6,407,465 B1 | 6/2002 | Peltz et al. |
| 5,454,426 A | 10/1995 | Moseley | 6,419,462 B1 | 7/2002 | Horie et al. |
| 5,467,722 A | 11/1995 | Meratla | 6,422,016 B2 | 7/2002 | Alkhamis |
| 5,477,677 A | 12/1995 | Krnavek | 6,478,289 B1 | 11/2002 | Trewin |
| 5,491,969 A | 2/1996 | Cohn et al. | 6,512,966 B2 | 1/2003 | Lof |
| 5,491,977 A | 2/1996 | Cho | 6,513,326 B1 | 2/2003 | Maceda et al. |
| 5,524,821 A | 6/1996 | Vie et al. | 6,516,615 B1 | 2/2003 | Stockhausen et al. |
| 5,537,822 A | 7/1996 | Shnaid et al. | 6,516,616 B2 | 2/2003 | Carver |
| 5,544,698 A | 8/1996 | Paulman | 6,598,392 B2 | 7/2003 | Majeres |
| 5,557,934 A | 9/1996 | Beach | 6,598,402 B2 | 7/2003 | Kataoka et al. |
| 5,561,978 A | 10/1996 | Buschur | 6,606,860 B2 | 8/2003 | McFarland |
| 5,562,010 A | 10/1996 | McGuire | 6,612,348 B1 | 9/2003 | Wiley |
| 5,579,640 A | 12/1996 | Gray, Jr. et al. | 6,619,930 B2 | 9/2003 | Jansen et al. |
| 5,584,664 A | 12/1996 | Elliott et al. | 6,626,212 B2 | 9/2003 | Morioka et al. |
| 5,592,028 A | 1/1997 | Pritchard | 6,629,413 B1 | 10/2003 | Wendt et al. |
| 5,598,736 A | 2/1997 | Erskine | 6,637,185 B2 | 10/2003 | Hatamiya et al. |
| 5,599,172 A | 2/1997 | Mccabe | 6,652,241 B1 | 11/2003 | Alder |
| 5,600,953 A | 2/1997 | Oshita et al. | 6,652,243 B2 | 11/2003 | Krasnov |
| 5,616,007 A | 4/1997 | Cohen | 6,666,024 B1 | 12/2003 | Moskal |
| 5,634,340 A | 6/1997 | Grennan | 6,670,402 B1 | 12/2003 | Lee et al. |
| 5,641,273 A | 6/1997 | Moseley | 6,672,056 B2 | 1/2004 | Roth et al. |

| Patent | Date | Inventor |
|---|---|---|
| 6,675,765 B2 | 1/2004 | Endoh |
| 6,688,108 B1 | 2/2004 | Van Liere |
| 6,698,472 B2 | 3/2004 | Camacho et al. |
| 6,711,984 B2 | 3/2004 | Tagge et al. |
| 6,712,166 B2 | 3/2004 | Rush et al. |
| 6,715,514 B2 | 4/2004 | Parker, III |
| 6,718,761 B2 | 4/2004 | Merswolke et al. |
| 6,739,131 B1 | 5/2004 | Kershaw |
| 6,739,419 B2 | 5/2004 | Jain et al. |
| 6,745,569 B2 | 6/2004 | Gerdes |
| 6,745,801 B1 | 6/2004 | Cohen et al. |
| 6,748,737 B2 | 6/2004 | Lafferty |
| 6,762,926 B1 | 7/2004 | Shiue et al. |
| 6,786,245 B1 | 9/2004 | Eichelberger |
| 6,789,387 B2 | 9/2004 | Brinkman |
| 6,789,576 B2 | 9/2004 | Umetsu et al. |
| 6,797,039 B2 | 9/2004 | Spencer |
| 6,815,840 B1 | 11/2004 | Aldendeshe |
| 6,817,185 B2 | 11/2004 | Coney et al. |
| 6,834,737 B2 | 12/2004 | Bloxham |
| 6,840,309 B2 | 1/2005 | Wilson et al. |
| 6,848,259 B2 | 2/2005 | Kelller-sornig |
| 6,857,450 B2 | 2/2005 | Rupp |
| 6,874,453 B2 | 4/2005 | Coney et al. |
| 6,883,775 B2 | 4/2005 | Coney et al. |
| 6,886,326 B2 | 5/2005 | Holtzapple et al. |
| 6,892,802 B2 | 5/2005 | Kelly et al. |
| 6,900,556 B2 | 5/2005 | Provanzana |
| 6,922,991 B2 | 8/2005 | Polcuch |
| 6,925,821 B2 | 8/2005 | Sienel |
| 6,927,503 B2 | 8/2005 | Enish et al. |
| 6,931,848 B2 | 8/2005 | Maceda et al. |
| 6,935,096 B2 | 8/2005 | Haiun |
| 6,938,415 B2 | 9/2005 | Last |
| 6,938,654 B2 | 9/2005 | Gershtein et al. |
| 6,946,017 B2 | 9/2005 | Leppin et al. |
| 6,948,328 B2 | 9/2005 | Kidwell |
| 6,952,058 B2 | 10/2005 | Mccoin |
| 6,959,546 B2 | 11/2005 | Corcoran |
| 6,963,802 B2 | 11/2005 | Enis et al. |
| 6,964,165 B2 | 11/2005 | Uhl et al. |
| 6,964,176 B2 | 11/2005 | Kidwell |
| 6,974,307 B2 | 12/2005 | Antoune et al. |
| 7,000,389 B2 | 2/2006 | Lewellin |
| 7,007,474 B1 | 3/2006 | Ochs et al. |
| 7,017,690 B2 | 3/2006 | Burke |
| 7,028,934 B2 | 4/2006 | Burynski, Jr. |
| 7,040,083 B2 | 5/2006 | Horii et al. |
| 7,040,108 B1 | 5/2006 | Flammang |
| 7,040,859 B2 | 5/2006 | Kane |
| 7,043,920 B2 | 5/2006 | Viteri et al. |
| 7,047,744 B1 | 5/2006 | Robertson et al. |
| 7,055,325 B2 | 6/2006 | Wolken |
| 7,067,937 B2 | 6/2006 | Enish et al. |
| 7,075,189 B2 | 7/2006 | Heronemus |
| RE39,249 E | 8/2006 | Link, Jr. |
| 7,084,520 B2 | 8/2006 | Zambrano |
| 7,086,231 B2 | 8/2006 | Pinkerton |
| 7,093,450 B2 | 8/2006 | Jimenez Haertel et al. |
| 7,093,626 B2 | 8/2006 | Li et al. |
| 7,098,552 B2 | 8/2006 | Mccoin |
| 7,107,766 B2 | 9/2006 | Zacche' et al. |
| 7,107,767 B2 | 9/2006 | Frazer et al. |
| 7,116,006 B2 | 10/2006 | Mccoin |
| 7,124,576 B2 | 10/2006 | Cherney et al. |
| 7,124,586 B2 | 10/2006 | Negre et al. |
| 7,127,895 B2 | 10/2006 | Pinkerton et al. |
| 7,128,777 B2 | 10/2006 | Spencer |
| 7,134,279 B2 | 11/2006 | White |
| 7,155,912 B2 | 1/2007 | Enis et al. |
| 7,168,928 B1 | 1/2007 | West |
| 7,168,929 B2 | 1/2007 | Sieqel et al. |
| 7,169,489 B2 | 1/2007 | Redmond |
| 7,177,751 B2 | 2/2007 | Froloff |
| 7,178,337 B2 | 2/2007 | Pflanz |
| 7,191,603 B2 | 3/2007 | Taube |
| 7,197,871 B2 | 4/2007 | Yoshino |
| 7,201,095 B2 | 4/2007 | Hughey |
| 7,218,009 B2 | 5/2007 | Hendrickson et al. |
| 7,219,779 B2 | 5/2007 | Baueretal |
| 7,225,762 B2 | 6/2007 | Mahlanen |
| 7,228,690 B2 | 6/2007 | Barker |
| 7,230,348 B2 | 6/2007 | Poole |
| 7,231,998 B1 | 6/2007 | Schechter |
| 7,240,812 B2 | 7/2007 | Kamikozuru |
| 7,249,617 B2 | 7/2007 | Musselman et al. |
| 7,254,944 B1 | 8/2007 | Goetzinger et al. |
| 7,273,122 B2 | 9/2007 | Rose |
| 7,281,371 B1 | 10/2007 | Heidenreich |
| 7,308,361 B2 | 12/2007 | Enis et al. |
| 7,317,261 B2 | 1/2008 | Rolt |
| 7,322,377 B2 | 1/2008 | Baltes |
| 7,325,401 B1 | 2/2008 | Kesseli et al. |
| 7,328,575 B2 | 2/2008 | Hedman |
| 7,329,099 B2 | 2/2008 | Hartman |
| 7,347,049 B2 | 3/2008 | Rajendran et al. |
| 7,353,786 B2 | 4/2008 | Scuderi et al. |
| 7,353,845 B2 | 4/2008 | Underwood et al. |
| 7,354,252 B2 | 4/2008 | Baatrup et al. |
| 7,364,410 B2 | 4/2008 | Link, Jr. |
| 7,392,871 B2 | 7/2008 | Severinsky et al. |
| 7,406,828 B1 | 8/2008 | Nakhamkin |
| 7,407,501 B2 | 8/2008 | Zvuloni |
| 7,415,835 B2 | 8/2008 | Cowans et al. |
| 7,415,995 B2 | 8/2008 | Plummer et al. |
| 7,417,331 B2 | 8/2008 | De La Torre et al. |
| 7,418,820 B2 | 9/2008 | Harvey et al. |
| 7,436,086 B2 | 10/2008 | McClintic |
| 7,441,399 B2 | 10/2008 | Utamura |
| 7,448,213 B2 | 11/2008 | Mitani |
| 7,453,164 B2 | 11/2008 | Borden et al. |
| 7,469,527 B2 | 12/2008 | Negre et al. |
| 7,471,010 B1 | 12/2008 | Fingersh |
| 7,481,337 B2 | 1/2009 | Luharuka et al. |
| 7,488,159 B2 | 2/2009 | Bhatt et al. |
| 7,527,483 B1 | 5/2009 | Glauber |
| 7,579,700 B1 | 8/2009 | Meller |
| 7,603,970 B2 | 10/2009 | Scuderi et al. |
| 7,607,503 B1 | 10/2009 | Schechter |
| 7,693,402 B2 | 4/2010 | Hudson et al. |
| 7,802,426 B2 | 9/2010 | Bollinger |
| 7,827,787 B2 | 11/2010 | Cherney et al. |
| 7,832,207 B2 | 11/2010 | McBride et al. |
| 7,843,076 B2 | 11/2010 | Gogoana et al. |
| 7,874,155 B2 | 1/2011 | McBride et al. |
| 7,900,444 B1 | 3/2011 | McBride et al. |
| 7,958,731 B2 | 6/2011 | McBride et al. |
| 7,963,110 B2 | 6/2011 | McBride et al. |
| 8,037,678 B2 | 10/2011 | McBride et al. |
| 8,046,990 B2 | 11/2011 | Bollinger et al. |
| 8,096,117 B2 * | 1/2012 | Ingersoll et al. ............... 60/408 |
| 8,104,274 B2 | 1/2012 | McBride et al. |
| 8,109,085 B2 | 2/2012 | McBride et al. |
| 8,117,842 B2 | 2/2012 | McBride et al. |
| 8,122,718 B2 | 2/2012 | McBride et al. |
| 2001/0045093 A1 | 11/2001 | Jacobson |
| 2003/0131599 A1 | 7/2003 | Gerdes |
| 2003/0145589 A1 | 8/2003 | Tillyer |
| 2003/0177767 A1 | 9/2003 | Keller-sornig et al. |
| 2003/0180155 A1 | 9/2003 | Coney et al. |
| 2004/0050042 A1 | 3/2004 | Frazer |
| 2004/0050049 A1 | 3/2004 | Wendt et al. |
| 2004/0146406 A1 | 7/2004 | Last |
| 2004/0146408 A1 | 7/2004 | Anderson |
| 2004/0148934 A1 | 8/2004 | Pinkerton et al. |
| 2004/0211182 A1 | 10/2004 | Gould |
| 2004/0244580 A1 | 12/2004 | Coney et al. |
| 2004/0261415 A1 | 12/2004 | Negre et al. |
| 2005/0016165 A1 | 1/2005 | Enis et al. |
| 2005/0028529 A1 | 2/2005 | Bartlett et al. |
| 2005/0047930 A1 | 3/2005 | Schmid |
| 2005/0072154 A1 | 4/2005 | Frutschi |
| 2005/0115234 A1 | 6/2005 | Asano et al. |
| 2005/0155347 A1 | 7/2005 | Lewellin |
| 2005/0166592 A1 | 8/2005 | Larson et al. |
| 2005/0274334 A1 | 12/2005 | Warren |
| 2005/0275225 A1 | 12/2005 | Bertolotti |
| 2005/0279086 A1 | 12/2005 | Hoos |

| | | |
|---|---|---|
| 2005/0279292 A1 | 12/2005 | Hudson et al. |
| 2005/0279296 A1 | 12/2005 | Coney et al. |
| 2006/0055175 A1 | 3/2006 | Grinblat |
| 2006/0059912 A1 | 3/2006 | Romanelli et al. |
| 2006/0059936 A1 | 3/2006 | Radke et al. |
| 2006/0059937 A1 | 3/2006 | Perkins et al. |
| 2006/0075749 A1 | 4/2006 | Cherney et al. |
| 2006/0090467 A1 | 5/2006 | Crow |
| 2006/0090477 A1 | 5/2006 | Rolff |
| 2006/0107664 A1 | 5/2006 | Hudson et al. |
| 2006/0162543 A1 | 7/2006 | Abe et al. |
| 2006/0162910 A1 | 7/2006 | Kelly et al. |
| 2006/0175337 A1 | 8/2006 | Defosset |
| 2006/0201148 A1 | 9/2006 | Zabtcioqlu |
| 2006/0248886 A1 | 11/2006 | Ma |
| 2006/0248892 A1 | 11/2006 | Ingersoll |
| 2006/0254281 A1 | 11/2006 | Badeer et al. |
| 2006/0260311 A1 | 11/2006 | Ingersoll |
| 2006/0260312 A1 | 11/2006 | Ingersoll |
| 2006/0262465 A1 | 11/2006 | Wiederhold |
| 2006/0266034 A1 | 11/2006 | Ingersoll |
| 2006/0266035 A1 | 11/2006 | Ingersoll et al. |
| 2006/0266036 A1 | 11/2006 | Ingersoll |
| 2006/0266037 A1 | 11/2006 | Ingersoll |
| 2006/0280993 A1 | 12/2006 | Keefer et al. |
| 2006/0283967 A1 | 12/2006 | Cho et al. |
| 2007/0006586 A1 | 1/2007 | Hoffman et al. |
| 2007/0022754 A1 | 2/2007 | Perkins et al. |
| 2007/0022755 A1 | 2/2007 | Pinkerton et al. |
| 2007/0062194 A1 | 3/2007 | Ingersoll |
| 2007/0074533 A1 | 4/2007 | Hugenroth et al. |
| 2007/0095069 A1 | 5/2007 | Joshi et al. |
| 2007/0113803 A1 | 5/2007 | Froloff et al. |
| 2007/0116572 A1 | 5/2007 | Barbu et al. |
| 2007/0137595 A1 | 6/2007 | Greenwell |
| 2007/0151528 A1 | 7/2007 | Hedman |
| 2007/0158946 A1 | 7/2007 | Annen et al. |
| 2007/0181199 A1 | 8/2007 | Weber |
| 2007/0182160 A1 | 8/2007 | Enis et al. |
| 2007/0205298 A1 | 9/2007 | Harrison et al. |
| 2007/0234749 A1 | 10/2007 | Enis et al. |
| 2007/0243066 A1 | 10/2007 | Baron |
| 2007/0245735 A1 | 10/2007 | Ashikian |
| 2007/0258834 A1 | 11/2007 | Froloff et al. |
| 2008/0000436 A1 | 1/2008 | Goldman |
| 2008/0016868 A1 | 1/2008 | Ochs et al. |
| 2008/0047272 A1 | 2/2008 | Schoell |
| 2008/0050234 A1 | 2/2008 | Ingersoll et al. |
| 2008/0072870 A1 | 3/2008 | Chomyszak et al. |
| 2008/0087165 A1 | 4/2008 | Wright et al. |
| 2008/0104939 A1 | 5/2008 | Hoffmann et al. |
| 2008/0112807 A1 | 5/2008 | Uphues et al. |
| 2008/0127632 A1 | 6/2008 | Finkenrath et al. |
| 2008/0138265 A1 | 6/2008 | Lackner et al. |
| 2008/0155975 A1 | 7/2008 | Brinkman |
| 2008/0155976 A1 | 7/2008 | Smith et al. |
| 2008/0157528 A1 | 7/2008 | Wang et al. |
| 2008/0157537 A1 | 7/2008 | Richard |
| 2008/0164449 A1 | 7/2008 | Gray et al. |
| 2008/0185194 A1 | 8/2008 | Leone |
| 2008/0202120 A1 | 8/2008 | Karyambas |
| 2008/0211230 A1 | 9/2008 | Gurin |
| 2008/0228323 A1 | 9/2008 | Laumer et al. |
| 2008/0233029 A1 | 9/2008 | Fan et al. |
| 2008/0238105 A1 | 10/2008 | Ortiz et al. |
| 2008/0238187 A1 | 10/2008 | Garnett et al. |
| 2008/0250788 A1 | 10/2008 | Nuel et al. |
| 2008/0251302 A1 | 10/2008 | Lynn et al. |
| 2008/0272597 A1 | 11/2008 | Althaus |
| 2008/0272598 A1 | 11/2008 | Nakhamkin |
| 2008/0272605 A1 | 11/2008 | Borden et al. |
| 2008/0308168 A1 | 12/2008 | O'Brien, II et al. |
| 2008/0308270 A1 | 12/2008 | Wilson |
| 2008/0315589 A1 | 12/2008 | Malmrup |
| 2009/0000290 A1 | 1/2009 | Brinkman |
| 2009/0007558 A1 | 1/2009 | Hall et al. |
| 2009/0008173 A1 | 1/2009 | Hall et al. |
| 2009/0010772 A1 | 1/2009 | Siemroth |
| 2009/0020275 A1 | 1/2009 | Neher et al. |
| 2009/0021012 A1 | 1/2009 | Stull et al. |
| 2009/0056331 A1 | 3/2009 | Zhao et al. |
| 2009/0071153 A1 | 3/2009 | Boyapati et al. |
| 2009/0107784 A1 | 4/2009 | Gabriel et al. |
| 2009/0145130 A1 | 6/2009 | Kaufman |
| 2009/0158740 A1 | 6/2009 | Littau et al. |
| 2009/0178409 A1 | 7/2009 | Shinnar |
| 2009/0200805 A1 | 8/2009 | Kim et al. |
| 2009/0220364 A1 | 9/2009 | Rigal et al. |
| 2009/0229902 A1 | 9/2009 | Stansbury, III |
| 2009/0249826 A1 | 10/2009 | Hugelman |
| 2009/0282822 A1 | 11/2009 | McBride et al. |
| 2009/0282840 A1 | 11/2009 | Chen et al. |
| 2009/0294096 A1 | 12/2009 | Mills et al. |
| 2009/0301089 A1 | 12/2009 | Bollinger |
| 2009/0317267 A1 | 12/2009 | Gill et al. |
| 2009/0322090 A1 | 12/2009 | Wolf |
| 2010/0018196 A1 | 1/2010 | Li et al. |
| 2010/0077765 A1 | 4/2010 | Japikse |
| 2010/0089063 A1 | 4/2010 | McBride et al. |
| 2010/0133903 A1 | 6/2010 | Rufer |
| 2010/0139277 A1 | 6/2010 | McBride et al. |
| 2010/0193270 A1 | 8/2010 | Deshaies et al. |
| 2010/0199652 A1 | 8/2010 | Lemofouet et al. |
| 2010/0205960 A1 | 8/2010 | McBride et al. |
| 2010/0229544 A1 | 9/2010 | Bollinger et al. |
| 2010/0307156 A1 | 12/2010 | Bollinger |
| 2010/0326062 A1 | 12/2010 | Fong et al. |
| 2010/0326064 A1 | 12/2010 | Fong et al. |
| 2010/0326066 A1 | 12/2010 | Fong et al. |
| 2010/0326068 A1 | 12/2010 | Fong et al. |
| 2010/0326069 A1 | 12/2010 | Fong et al. |
| 2010/0326075 A1 | 12/2010 | Fong et al. |
| 2010/0329891 A1 | 12/2010 | Fong et al. |
| 2010/0329903 A1 | 12/2010 | Fong et al. |
| 2010/0329909 A1 | 12/2010 | Fong et al. |
| 2011/0023488 A1 | 2/2011 | Fong et al. |
| 2011/0023977 A1 | 2/2011 | Fong et al. |
| 2011/0030359 A1 | 2/2011 | Fong et al. |
| 2011/0030552 A1 | 2/2011 | Fong et al. |
| 2011/0056193 A1 | 3/2011 | McBride et al. |
| 2011/0056368 A1 | 3/2011 | McBride et al. |
| 2011/0061741 A1 | 3/2011 | Ingersoll et al. |
| 2011/0061836 A1 | 3/2011 | Ingersoll et al. |
| 2011/0062166 A1 | 3/2011 | Ingersoll et al. |
| 2011/0107755 A1 | 5/2011 | McBride et al. |
| 2011/0115223 A1 | 5/2011 | Stahlkopf et al. |
| 2011/0131966 A1 | 6/2011 | McBride et al. |
| 2011/0138797 A1 | 6/2011 | Bollinger et al. |
| 2011/0167813 A1 | 7/2011 | McBride et al. |
| 2011/0204064 A1 | 8/2011 | Crane et al. |
| 2011/0219760 A1 | 9/2011 | McBride et al. |
| 2011/0219763 A1 | 9/2011 | McBride et al. |
| 2011/0232281 A1 | 9/2011 | McBride et al. |
| 2011/0233934 A1 | 9/2011 | Crane et al. |
| 2011/0252777 A1 | 10/2011 | Bollinger et al. |
| 2011/0258996 A1 | 10/2011 | Ingersoll et al. |
| 2011/0258999 A1 | 10/2011 | Ingersoll et al. |
| 2011/0259001 A1 | 10/2011 | McBride et al. |
| 2011/0259442 A1 | 10/2011 | McBride et al. |
| 2011/0266810 A1 | 11/2011 | McBride et al. |
| 2011/0283690 A1 | 11/2011 | McBride et al. |
| 2011/0296822 A1 | 12/2011 | Bollinger et al. |
| 2011/0296823 A1 | 12/2011 | McBride et al. |
| 2011/0314800 A1 | 12/2011 | Fong et al. |
| 2011/0314804 A1 | 12/2011 | Fong et al. |
| 2012/0000557 A1 | 1/2012 | McBride et al. |
| 2012/0006013 A1 | 1/2012 | McBride et al. |
| 2012/0017580 A1 | 1/2012 | Fong et al. |
| 2012/0019009 A1 | 1/2012 | Fong et al. |
| 2012/0023919 A1 | 2/2012 | Fong et al. |
| 2012/0036851 A1 | 2/2012 | McBride et al. |
| 2012/0042772 A1 | 2/2012 | Fong et al. |
| 2012/0047884 A1 | 3/2012 | McBride et al. |
| 2012/0055147 A1 | 3/2012 | Fong et al. |
| 2012/0057996 A1 | 3/2012 | Fong et al. |
| 2012/0057998 A1 | 3/2012 | Ingersoll et al. |

FOREIGN PATENT DOCUMENTS

| | | |
|---|---|---|
| BE | 1008885 | 8/1996 |
| CN | 1061262 | 5/1992 |
| CN | 1171490 | 1/1998 |
| CN | 1276308 | 12/2000 |
| CN | 1277323 | 12/2000 |
| CN | 1412443 | 4/2003 |
| CN | 1743665 | 3/2006 |
| CN | 2821162 | 9/2006 |
| CN | 2828319 | 10/2006 |
| CN | 2828368 | 10/2006 |
| CN | 1884822 | 12/2006 |
| CN | 1888328 | 1/2007 |
| CN | 1967091 | 5/2007 |
| CN | 101033731 | 9/2007 |
| CN | 101042115 | 9/2007 |
| CN | 101070822 | 11/2007 |
| CN | 101149002 | 3/2008 |
| CN | 101162073 | 4/2008 |
| CN | 201103518 | 8/2008 |
| CN | 201106527 | 8/2008 |
| CN | 101289963 | 10/2008 |
| CN | 201125855 | 10/2008 |
| CN | 101377190 | 4/2009 |
| CN | 101408213 | 4/2009 |
| CN | 101435451 | 5/2009 |
| DE | 25 38 870 | 6/1977 |
| DE | 19530253 | 11/1996 |
| DE | 19903907 | 8/2000 |
| DE | 19911534 | 9/2000 |
| DE | 10042020 | 5/2001 |
| DE | 20118183 | 3/2003 |
| DE | 20120330 | 4/2003 |
| DE | 10147940 | 5/2003 |
| DE | 10205733 | 8/2003 |
| DE | 10212480 | 10/2003 |
| DE | 20312293 | 12/2003 |
| DE | 10220499 | 4/2004 |
| DE | 10334637 | 2/2005 |
| DE | 10 2005 047622 | 4/2007 |
| EP | 0204748 | 3/1981 |
| EP | 0091801 | 10/1983 |
| EP | 0097002 | 12/1983 |
| EP | 0196690 | 10/1986 |
| EP | 0212692 | 3/1987 |
| EP | 0364106 | 4/1990 |
| EP | 0507395 | 10/1992 |
| EP | 0821162 | 1/1998 |
| EP | 0 857 877 | 8/1998 |
| EP | 1 388 442 | 2/2004 |
| EP | 1405662 | 4/2004 |
| EP | 1657452 | 11/2004 |
| EP | 1726350 | 11/2006 |
| EP | 1741899 | 1/2007 |
| EP | 1 780 058 | 5/2007 |
| EP | 1988294 | 11/2008 |
| EP | 2014896 | 1/2009 |
| EP | 2078857 | 7/2009 |
| FR | 2449805 | 9/1980 |
| FR | 2816993 | 5/2002 |
| FR | 2829805 | 3/2003 |
| GB | 722524 | 11/1951 |
| GB | 772703 | 4/1957 |
| GB | 1449076 | 9/1976 |
| GB | 1479940 | 7/1977 |
| GB | 2106992 | 4/1983 |
| GB | 2223810 | 4/1990 |
| GB | 2 300 673 | 11/1996 |
| GB | 2373546 | 9/2002 |
| GB | 2403356 | 12/2004 |
| JP | 57010778 | 1/1982 |
| JP | 57070970 | 5/1982 |
| JP | 57120058 | 7/1982 |
| JP | 58183880 | 10/1982 |
| JP | 58150079 | 9/1983 |
| JP | 58192976 | 11/1983 |
| JP | 60206985 | 10/1985 |
| JP | 62101900 | 5/1987 |
| JP | 63227973 | 9/1988 |
| JP | 2075674 | 3/1990 |
| JP | 2247469 | 10/1990 |
| JP | 3009090 | 1/1991 |
| JP | 3281984 | 12/1991 |
| JP | 4121424 | 4/1992 |
| JP | 6185450 | 7/1994 |
| JP | 8145488 | 6/1996 |
| JP | 9166079 | 6/1997 |
| JP | 10313547 | 11/1998 |
| JP | 2000-346093 | 6/1999 |
| JP | 11351125 | 12/1999 |
| JP | 2000166128 | 6/2000 |
| JP | 2000346093 | 12/2000 |
| JP | 2002127902 | 5/2002 |
| JP | 2003083230 | 3/2003 |
| JP | 2005023918 | 1/2005 |
| JP | 2005036769 | 2/2005 |
| JP | 2005068963 | 3/2005 |
| JP | 2006220252 | 8/2006 |
| JP | 2007001872 | 1/2007 |
| JP | 2007145251 | 6/2007 |
| JP | 2007211730 | 8/2007 |
| JP | 2008038658 | 2/2008 |
| KR | 840000180 | 2/1984 |
| KR | 2004004637 | 1/2004 |
| RU | 2101562 | 1/1998 |
| RU | 2169857 | 6/2001 |
| RU | 2213255 | 9/2003 |
| SU | 800438 | 1/1981 |
| UA | 69030 | 8/2004 |
| WO | WO-82/00319 | 2/1982 |
| WO | WO-8802818 | 4/1988 |
| WO | WO-99/41498 | 8/1990 |
| WO | WO-92/22741 | 12/1992 |
| WO | WO-93/06367 | 4/1993 |
| WO | WO-93/11363 | 6/1993 |
| WO | WO-93/24754 | 12/1993 |
| WO | WO 9412785 | 6/1994 |
| WO | WO-95/25381 | 9/1995 |
| WO | WO-96/01942 | 1/1996 |
| WO | WO-96/22456 | 7/1996 |
| WO | WO-96/34213 | 10/1996 |
| WO | WO-97/01029 | 1/1997 |
| WO | WO-97/17546 | 5/1997 |
| WO | WO-98/02818 | 1/1998 |
| WO | WO-98/17492 | 4/1998 |
| WO | WO-00/01945 | 1/2000 |
| WO | WO-00/37800 | 6/2000 |
| WO | WO-00/65212 | 11/2000 |
| WO | WO-00/68578 | 11/2000 |
| WO | WO-01/75308 | 10/2001 |
| WO | WO 0175290 | 10/2001 |
| WO | WO-02/25083 | 3/2002 |
| WO | WO-02/46621 | 6/2002 |
| WO | WO-02/103200 | 12/2002 |
| WO | WO-03/021107 | 3/2003 |
| WO | WO-03021702 | 3/2003 |
| WO | WO-03/078812 | 9/2003 |
| WO | WO-03081011 | 10/2003 |
| WO | WO-2004/034391 | 5/2004 |
| WO | WO-2004/059155 | 7/2004 |
| WO | WO-2004/072452 | 8/2004 |
| WO | WO-2004/074679 | 9/2004 |
| WO | WO-2004/109172 | 12/2004 |
| WO | WO-2005/044424 | 5/2005 |
| WO | WO-2005/062969 | 7/2005 |
| WO | WO-2005/067373 | 7/2005 |
| WO | WO-2005/079461 | 9/2005 |
| WO | WO-2005/088131 | 9/2005 |
| WO | WO-2005/095155 | 10/2005 |
| WO | WO-2006/029633 | 3/2006 |
| WO | WO-2006/058085 | 6/2006 |
| WO | WO-2006/124006 | 11/2006 |
| WO | WO-2007/002094 | 1/2007 |
| WO | WO-2007/003954 | 1/2007 |
| WO | WO-2007/012143 | 2/2007 |
| WO | WO-2007/035997 | 4/2007 |
| WO | WO-2007/051034 | 5/2007 |
| WO | WO-2007/066117 | 6/2007 |

| | | |
|---|---|---|
| WO | WO-07/86792 | 8/2007 |
| WO | WO-2007/089872 | 8/2007 |
| WO | WO-2007/096656 | 8/2007 |
| WO | WO-2007/111839 | 10/2007 |
| WO | WO-2007/136765 | 11/2007 |
| WO | WO-2007140914 | 12/2007 |
| WO | WO-2008/003950 | 1/2008 |
| WO | WO-2008/014769 | 2/2008 |
| WO | WO-2008023901 | 2/2008 |
| WO | WO-2008/027259 | 3/2008 |
| WO | WO-2008/028881 | 3/2008 |
| WO | WO-2008/039725 | 4/2008 |
| WO | WO-2008/045468 | 4/2008 |
| WO | WO-2009045468 | 4/2008 |
| WO | WO-2008/051427 | 5/2008 |
| WO | WO-2008/074075 | 6/2008 |
| WO | WO-2008/084507 | 7/2008 |
| WO | WO-2008/091373 | 7/2008 |
| WO | WO 2008102292 | 8/2008 |
| WO | WO-2008/106967 | 9/2008 |
| WO | WO-2008/108870 | 9/2008 |
| WO | WO-2008/109006 | 9/2008 |
| WO | WO-2008/110018 | 9/2008 |
| WO | WO-2008/115479 | 9/2008 |
| WO | WO-2008/121378 | 10/2008 |
| WO | WO-2008139267 | 11/2008 |
| WO | WO-2008/152432 | 12/2008 |
| WO | WO-2008/153591 | 12/2008 |
| WO | WO-2008/157327 | 12/2008 |
| WO | WO-2009/034548 | 3/2009 |
| WO | WO-2009/038973 | 3/2009 |
| WO | WO-2009034421 | 3/2009 |
| WO | WO-2009/045110 | 4/2009 |
| WO | WO-2009044139 | 4/2009 |
| WO | WO-2009/114205 | 9/2009 |
| WO | WO-2009/126784 | 10/2009 |
| WO | WO-2010/006319 | 1/2010 |
| WO | WO-2010/009053 | 1/2010 |
| WO | WO-2010/040890 | 4/2010 |
| WO | WO-2010/105155 | 9/2010 |
| WO | WO-2010/135658 | 11/2010 |
| WO | WO-2011/008321 | 1/2011 |
| WO | WO-2011/008325 | 1/2011 |
| WO | WO-2011/008500 | 1/2011 |
| WO | WO-2011/079267 | 6/2011 |
| WO | WO-2011/079271 | 6/2011 |

OTHER PUBLICATIONS

Rufer et al., "Energetic Performance of a Hybrid Energy Storage System Based on Compressed Air and Super Capacitors," Power Electronics, Electrical Drives, Automation and Motion, (May 1, 2006), pp. 469-474.

Lemofouet et al. "Hybrid Energy Storage Systems based on Compressed Air and Supercapacitors with Maximum Efficiency Point Tracking," Industrial Electronics Laboratory (LEI), (2005), pp. 1-10.

Lemofouet et al. "Hybrid Energy Storage Systems based on Compressed Air and Supercapacitors with Maximum Efficiency Point Tracking," The International Power Electronics Conference, (2005), pp. 461-468.

"Hydraulic Transformer Supplies Continuous High Pressure," Machine Design, Penton Media, vol. 64, No. 17, (Aug. 1992), 1 page.

Lemofouet, "Investigation and Optimisation of Hybrid Electricity Storage Systems Based on Compressed Air and Supercapacitors," (Oct. 20, 2006), 250 pages.

Cyphelly et al., "Usage of Compressed Air Storage Systems," BFE-Program "Electricity," Final Report, May 2004, 14 pages.

Lemofouet et al., "A Hybrid Energy Storage System Based on Compressed Air and Supercapacitors with Maximum Efficiency Point Tracking (MEPT)," IEEE Transactions on Industrial Electron, vol. 53, No. 4, (Aug. 2006) pp. 1105-1115.

International Search Report and Written Opinion issued Sep. 15, 2009 for International Application No. PCT/US2009/040027, 8 pages.

International Search Report and Written Opinion issued Aug. 30, 2010 for International Application No. PCT/US2010/029795, 9 pages.

International Search Report and Written Opinion issued Dec. 3, 2009 for International Application No. PCT/US2009/046725, 9 pages.

International Search Report and Written Opinion issued Jan. 4, 2011 for International Application No. PCT/US2010/055279, 13 pages.

International Preliminary Report on Patentability mailed Oct. 13, 2011 for International Application No. PCT/US2010/029795 (9 pages).

Stephenson et al., "Computer Modelling of Isothermal Compression in the Reciprocating Compressor of a Complete Isoengine," 9th International Conference on Liquid Atomization and Spray Systems (Jul. 13-17, 2003).

Coney et al., "Development of a Reciprocating Compressor Using Water Injection to Achieve Quasi-Isothermal Compression," Purdue University International Compressor Engineering Conference (2002).

Linnemann et al., "The Isoengine—A Novel High Efficiency Engine with Optional Compressed Air Energy Storage (CAES)," International Joint Power Generation Conference (Jun. 16-19, 2003).

Linnemann et al., "The Isoengine: Realisation of a High-Efficiency Power Cycle Based on Isothermal Compression," Int. J. Energy Tech. and Policy, vol. 3, Nos. 1-2, pp. 66-84 (2005).

* cited by examiner though a spray head (in, e.g., a vertical cylinder), through a spray rod arranged coaxially with the cylinder piston (in, e.g., a horizontal cylinder), or by any other mechanism that permits formation of a liquid spay within the cylinder. Droplets may

IMPROVING EFFICIENCY OF LIQUID HEAT EXCHANGE IN COMPRESSED-GAS ENERGY STORAGE SYSTEMS

RELATED APPLICATIONS

This application is a continuation of U.S. patent application Ser. No. 13/082,808, filed on Apr. 8, 2011, which claims the benefit of and priority to U.S. Provisional Patent Application No. 61/322,033, filed Apr. 8, 2010, and U.S. Provisional Patent Application No. 61/361,096, filed Jul. 2, 2010. The entire disclosure of each of these applications is hereby incorporated herein by reference.

STATEMENT REGARDING FEDERALLY SPONSORED RESEARCH

This invention was made with government support under IIP-0810590 and IIP-0923633 awarded by the NSF and DE-OE0000231 awarded by the DOE. The government has certain rights in the invention.

FIELD OF THE INVENTION

In various embodiments, the present invention relates to pneumatics, power generation, and energy storage, and more particularly, to compressed-gas energy-storage systems and methods using pneumatic or pneumatic/hydraulic cylinders.

BACKGROUND

Storing energy in the form of compressed gas has a long history and components tend to be well tested and reliable, and have long lifetimes. The general principle of compressed-gas or compressed-air energy storage (CAES) is that generated energy (e.g., electric energy) is used to compress gas (e.g., air), thus converting the original energy to pressure potential energy; this potential energy is later recovered in a useful form (e.g., converted back to electricity) via gas expansion coupled to an appropriate mechanism. Advantages of compressed-gas energy storage include low specific-energy costs, long lifetime, low maintenance, reasonable energy density, and good reliability.

If a body of gas is at the same temperature as its environment, and expansion occurs slowly relative to the rate of heat exchange between the gas and its environment, then the gas will remain at approximately constant temperature as it expands. This process is termed "isothermal" expansion. Isothermal expansion of a quantity of high-pressure gas stored at a given temperature recovers approximately three times more work than would "adiabatic expansion," that is, expansion where no heat is exchanged between the gas and its environment—e.g., because the expansion happens rapidly or in an insulated chamber. Gas may also be compressed isothermally or adiabatically.

An ideally isothermal energy-storage cycle of compression, storage, and expansion would have 100% thermodynamic efficiency. An ideally adiabatic energy-storage cycle would also have 100% thermodynamic efficiency, but there are many practical disadvantages to the adiabatic approach. These include the production of higher temperature and pressure extremes within the system, heat loss during the storage period, and inability to exploit environmental (e.g., cogenerative) heat sources and sinks during expansion and compression, respectively. In an isothermal system, the cost of adding a heat-exchange system is traded against resolving the difficulties of the adiabatic approach. In either case, mechanical energy from expanding gas must usually be converted to electrical energy before use.

An efficient and novel design for storing energy in the form of compressed gas utilizing near isothermal gas compression and expansion has been shown and described in U.S. patent application Ser. Nos. 12/421,057 (the '057 application) and 12/639,703 (the '703 application), the disclosures of which are hereby incorporated herein by reference in their entireties. The '057 and '703 applications disclose systems and methods for expanding gas isothermally in staged cylinders and intensifiers over a large pressure range in order to generate electrical energy when required. Mechanical energy from the expanding gas may be used to drive a hydraulic pump/motor subsystem that produces electricity. Systems and methods for hydraulic-pneumatic pressure intensification that may be employed in systems and methods such as those disclosed in the '057 and '703 applications are shown and described in U.S. patent application Ser. No. 12/879,595 (the '595 application), the disclosure of which is hereby incorporated herein by reference in its entirety.

In the systems disclosed in the '057 and '703 applications, reciprocal mechanical motion is produced during recovery of energy from storage by expansion of gas in the cylinders. This reciprocal motion may be converted to electricity by a variety of means, for example as disclosed in the '595 application as well as in U.S. patent application Ser. No. 12/938,853 (the '853 application), the disclosure of which is hereby incorporated herein by reference in its entirety. The ability of such systems to either store energy (i.e., use energy to compress gas into a storage reservoir) or produce energy (i.e., expand gas from a storage reservoir to release energy) will be apparent to any person reasonably familiar with the principles of electrical and pneumatic machines.

Gas undergoing expansion tends to cool, while gas undergoing compression tends to heat. To maximize efficiency (i.e., the fraction of elastic potential energy in the compressed gas that is converted to work, or vice versa), gas expansion and compression should be as near isothermal (i.e., constant-temperature) as possible. Several techniques of approximating isothermal expansion and compression may be employed.

First, as described in U.S. Pat. No. 7,802,426 (the '426 patent), the disclosure of which is hereby incorporated by reference herein in its entirety, gas undergoing either compression or expansion may be directed, continuously or in installments, through a heat-exchange subsystem external to the cylinder. The heat-exchange subsystem either rejects heat to the environment (to cool gas undergoing compression) or absorbs heat from the environment (to warm gas undergoing expansion). An isothermal process may be approximated via judicious selection of this heat-exchange rate.

Additionally, as described in the '703 application, droplets of a liquid (e.g., water) may be sprayed into a chamber of the cylinder in which gas is presently undergoing compression (or expansion) in order to transfer heat to or from the gas. As the liquid droplets exchange heat with the gas around them, the temperature of the gas is raised or lowered; the temperature of the droplets is also raised or lowered. The liquid is evacuated from the cylinder through a suitable mechanism. The heat-exchange spray droplets may be introduced through a spray head (in, e.g., a vertical cylinder), through a spray rod arranged coaxially with the cylinder piston (in, e.g., a horizontal cylinder), or by any other mechanism that permits formation of a liquid spay within the cylinder. Droplets may be used to either warm gas undergoing expansion or to cool gas undergoing compression. Again, an isothermal process may be approximated via judicious selection of this heat-exchange rate.

However, reductions in energy-conversion efficiency may still result in systems utilizing liquid-spray heat exchange. For example, portions of the gas undergoing compression or expansion may dissolve into the liquid utilized for heat exchange, and hence the total amount of energy storable or recoverable by the system is diminished. Moreover, the energy-storage-and-recovery system generally must consume power in order to form and maintain a suitable liquid heat-exchange spray, reducing the overall energy efficiency of the system. Thus, there is a need for systems utilizing liquid-based heat exchange that operate with higher efficiency and reduced power requirements.

SUMMARY

Embodiments of the invention reduce energetic losses caused by dissolution of air in heat-exchange liquids under high pressure, enabling more-efficient, substantially isothermal gas compression and expansion. The heat-exchange liquid may be water and/or another suitable liquid. Although the ensuing discussion refers to water as the heat-exchange liquid, it should be understood that this is merely for simplicity of presentation, and that other liquids—such as oils (natural and/or synthetic) or glycols—may be alternatively or additionally employed. Specifically, various embodiments diminish the effects of air solubility in water in liquid sprays that are injected into high-pressure gas (e.g., 3,000 pounds per square inch gauge [psig]) for heat exchange. Salts or other substances may be added to the water to reduce the solubility of air in the water (or other heat-exchange liquid) and/or to slow the dissolution of air in the water (or other heat-exchange liquid); the temperature of the liquid and gas within the system may be raised, reducing the solubility of air in the water; the system may be operated so as to reduce the time available for air to dissolve in the water, thus reducing the amount of air ultimately dissolved in the water; and/or the system may be operated so as to recover energy from dissolved gas using a regenerative piston stroke. Such techniques, applied separately or together in any of a variety of combinations, enable more-efficient, substantially isothermal gas compression and expansion.

Embodiments of the present invention also increase the heat-transfer potential of the liquid sprays provided to enable substantially isothermal expansion and compression inside cylinders or other mechanical devices for expanding or compressing gas, with resulting gain in the efficiency of the overall energy-storage and energy-recovery process. Specifically, various embodiments increase the heat-transfer potential of the liquid sprays. By altering the properties of the heat-exchange liquid itself by using additives, the efficiency of liquid-based heat-transfer systems may be increased by reducing the power needed to produce a suitably atomized spray of liquid.

The amount of heat that can be transferred to a given mass of liquid from a surrounding body of gas, or from the liquid to the gas, is primarily governed by the specific heat capacity of each (assuming that changes of phase can be ignored) and the temperature difference between the liquid and gas. Water has a high specific heat (1.00 cal/g-° C.) relative to most other liquids (e.g., ethyl alcohol, ~0.6 cal/g-° C.), making it particularly suitable as a heat-transfer medium.

Moreover, the rate at which heat can be transferred from a liquid to a gas, or from a gas to a liquid, is governed in large part by the area of contact between the two (i.e., the liquid surface area). In the heat-transfer systems described in the '703 application, a given mass of water is transformed into a spray in order to maximize surface area and thus heat transfer rate. For a given spherical volume of liquid V reduced to N spherical droplets, the total surface area of the liquid is proportional to $N^{2/3}$. Atomization of the liquid during spray generation (i.e., large N) is, therefore, generally conducive to increased heat transfer.

Spray quality—i.e., the effectiveness with which a given volume of heat-transfer liquid has been reduced to a large number of small droplets, approximately given by N/V—may be increased by utilizing a higher spray pressure drop, i.e., a larger change in pressure from the input of the spray-generating device to the output, with a concomitant increase in liquid velocity. However, increasing spray quality in this way requires increased power. Thus, there is a tradeoff between improved heat transfer due to better spray quality and the energy cost of increased pumping power.

The physics of single- and multiphase-flow of a liquid, as discussed below, are relevant to various embodiments of the invention. In general, at the point where a liquid exits a tube through a hole or orifice, it will generally be in a state of either laminar (streamline) or turbulent flow. In laminar flow, the particles (e.g., molecules) of the fluid flow in concentric streams parallel to the axis of the tube. Whether the flow is laminar or turbulent depends on, e.g., liquid viscosity, flow velocity, tube surface roughness, tube interior diameter, and changes in tube interior diameter along the tube axis. After exiting the orifice as a contiguous stream (i.e., a jet), the liquid will, in general, disintegrate, forming drops. The form, location, number, and motions of the resultant drops depend with complexity on the character of liquid flow at the exit point and the physical properties (e.g., viscosity, surface tension, etc.) of the liquid and also of the gas, if any, into which the liquid has been introduced.

Three basic types or regimes of liquid breakup and their relationship to liquid properties were usefully defined by W. Ohnesorge ("Formation of drops by nozzles and the breakup of liquid jets," 1936, *Zeitschrift für Angewandte Mathematik and Mechanik* [Applied Mathematics and Mechanics] (Berlin: Akademie Verlag) 16: 355-358 (the "Ohnesorge reference"), the entire disclosure of which is incorporated by reference herein. The first regime is large-droplet formation; the second is waves-and-droplet formation (irregular droplets form, varying widely in size and often joined by ligaments); and the third is spray or atomization (formation of a large number of small droplets, which may have approximately uniform size). In the figures, adapted from the Ohnesorge reference, the three regimes are shown as functions of two dimensionless numbers, namely, the Reynolds number (horizontal axis) and the Ohnesorge number (vertical axis). The Reynolds number ($R_e$) is a function of the liquid velocity at exit from the hole (V), hole diameter (D), liquid density ($\rho$), and liquid dynamic viscosity ($\mu$): $R_e = \rho V D/\mu$. The Ohnesorge number (O) is a function of hole diameter (D), liquid density ($\rho$), liquid dynamic viscosity ($\mu$), and liquid surface tension ($\delta$): $O = \mu/(\delta \rho D)^{1/2}$. For a given liquid flow, the ratio of $R_e$ and O determines the breakup regime. The chart, shown in FIG. 4A, and the dimensionless numbers associated with it will be readily understood by any person familiar with the science of fluid mechanics. The three types of liquid breakup denoted above and in FIG. 4A are illustrated in FIG. 4B.

As explained above, efficient liquid-gas heat transfer may be achieved utilizing a fine (atomized) spray of the liquid. Overall efficiency may be increased by expending the least possible energy to create the highest quality spray. A given liquid flow through a given orifice may be moved toward the "spray" regime in FIGS. 4A and 4B by increasing its Reynolds number, by increasing its Ohnesorge number, or both. Alternatively, a flow already in the spray regime may remain there even if its Reynolds number is decreased, as long as its Ohnesorge number is increased sufficiently at the same time, and vice versa.

As is evident from the definitional equations given above, the Reynolds number may be increased by increasing liquid velocity, increasing liquid density, or decreasing liquid viscosity. Similarly, the Ohnesorge number may be increased by increasing liquid viscosity or decreasing liquid surface tension or density. Changing liquid viscosity alone produces complementary changes in the Reynolds and Ohnesorge numbers and so produces movement on FIG. 4A parallel to the breakup-regime boundaries (i.e., it generally does not change the type of breakup). Velocity, density, and surface tension are, therefore, three variables that may be altered in embodiments of the present invention. Assuming a fixed orifice design, increasing liquid velocity generally requires increased power input, and changing the density of a liquid (e.g., water) is generally difficult. However, the surface tension of the liquid may be altered in order to increase its Ohnesorge number without affecting its Reynolds number. Increasing the Ohnesorge number in this way effectively enables the production of a spray (i.e., placement of the operating point in the spray regime) at a lower Reynolds number, e.g., at a lower liquid velocity. For example, reducing the surface tension of the liquid to one-third of the pure-liquid value increases the Ohnesorge number by a factor of $3^{1/2}$.

The surface tension of water, in particular, may be readily altered by dissolving certain chemicals therein. For example, dissolved surfactants reduce the surface tension of water, even in low concentrations. In a heat-transfer system, if a surfactant is added to the heat-exchange liquid (e.g., water), spray formation will occur with lower liquid injection velocity, therefore with lower power input, therefore with higher overall system efficiency, than would be the case without the addition of the surfactant. Simultaneously, additional system benefits (e.g., continuous surface cleaning to prevent or retard mineral deposit buildup or organic fouling) may be realized by appropriate choice of the surfactant chemical.

Thus, in general, various embodiments of the invention relate to systems and methods for decreasing the power required to produce an atomized spray in a liquid-gas heat-exchange system through the addition to the liquid of a substance such as a surfactant. For a given spray apparatus, a lower liquid injection velocity is thus needed to produce a fine or atomized spray than would be needed without the addition of the surfactant. The lower power required for spray production in an energy storage-and-retrieval system employing this method of heat transfer increases the overall efficiency of the system. The efficient generation of a liquid spray containing a surfactant chemical may be employed during the transfer of heat to a gas (e.g., during expansion of the gas) or during the removal of heat from a gas (e.g., during compression of the gas).

Embodiments of the present invention are typically utilized in energy storage and generation systems utilizing compressed gas. In a compressed-gas energy storage system, gas is stored at high pressure (e.g., approximately 3,000 psi). This gas may be expanded into a cylinder having a first compartment (or "chamber") and a second compartment separated by a piston slidably disposed within the cylinder (or by another boundary mechanism). A shaft may be coupled to the piston and extend through the first compartment and/or the second compartment of the cylinder and beyond an end cap of the cylinder, and a transmission mechanism may be coupled to the shaft for converting a reciprocal motion of the shaft into a rotary motion, as described in the '595 and '853 applications. Moreover, a motor/generator may be coupled to the transmission mechanism. Alternatively or additionally, the shaft of the cylinders may be coupled to one or more linear generators, as described in the '853 application.

As also described in the '853 application, the range of forces produced by expanding a given quantity of gas in a given time may be reduced through the addition of multiple, series-connected cylinder stages. That is, as gas from a high-pressure reservoir is expanded in one chamber of a first, high-pressure cylinder, gas from the other chamber of the first cylinder is directed to the expansion chamber of a second, lower-pressure cylinder. Gas from the lower-pressure chamber of this second cylinder may either be vented to the environment or directed to the expansion chamber of a third cylinder operating at still lower pressure; the third cylinder may be similarly connected to a fourth cylinder; and so on.

The principle may be extended to more than two cylinders to suit particular applications. For example, a narrower output force range for a given range of reservoir pressures is achieved by having a first, high-pressure cylinder operating between, for example, approximately 3,000 psig and approximately 300 psig and a second, larger-volume, lower-pressure cylinder operating between, for example, approximately 300 psig and approximately 30 psig. When two expansion cylinders are used, the range of pressure within either cylinder (and thus the range of force produced by either cylinder) is reduced as the square root relative to the range of pressure (or force) experienced with a single expansion cylinder, e.g., from approximately 100:1 to approximately 10:1 (as set forth in the '853 application). Furthermore, as set forth in the '595 application, N appropriately sized cylinders can reduce an original operating pressure range R to $R^{1/N}$. Any group of N cylinders staged in this manner, where $N \geq 2$, is herein termed a cylinder group.

All of the approaches described above for converting potential energy in compressed gas into mechanical and electrical energy may, if appropriately designed, be operated in reverse to store electrical energy as potential energy in a compressed gas. Since the accuracy of this statement will be apparent to any person reasonably familiar with the principles of electrical machines, power electronics, pneumatics, and the principles of thermodynamics, the operation of these mechanisms to both store energy and recover it from storage will not be described for each embodiment. Such operation is, however, contemplated and within the scope of the invention and may be straightforwardly realized without undue experimentation.

Embodiments of the invention may be implemented using any of the integrated heat-transfer systems and methods described in the '703 application and/or with the external heat-transfer systems and methods described in the '426 patent.

The compressed-air energy storage and recovery systems described herein are preferably "open-air" systems, i.e., systems that take in air from the ambient atmosphere for compression and vent air back to the ambient atmosphere after expansion, rather than systems that compress and expand a captured volume of gas in a sealed container (i.e., "closed-air" systems). Thus, the systems described herein generally feature one or more cylinder assemblies for the storage and recovery of energy via compression and expansion of gas. Selectively fluidly connected to the cylinder assembly are (i) means for storage of compressed gas after compression and supply of compressed gas for expansion thereof, and (ii) a vent for exhausting expanded gas to atmosphere after expansion and supply of gas for compression. The means for storage of compressed gas may include or consist essentially of, e.g., one or more pressure vessels or caverns. Open-air systems typically provide superior energy density relative to closed-air systems.

Furthermore, the systems described herein may be advantageously utilized to harness and recover sources of renewable energy, e.g., wind and solar energy. For example, energy stored during compression of the gas may originate from an intermittent renewable energy source of, e.g., wind or solar energy, and energy may be recovered via expansion of the gas when the intermittent renewable energy source is nonfunctional (i.e., either not producing harnessable energy or producing energy at lower-than-nominal levels). As such, the systems described herein may be connected to, e.g., solar panels or wind turbines, in order to store the renewable energy generated by such systems.

In one aspect, embodiments of the invention feature a method for improving efficiency of a compressed-gas energy storage and recovery system. Gas is compressed within a cylinder assembly from a first pressure to a second pressure, thereby storing energy. During the compression, a heat-transfer fluid is introduced into the cylinder assembly to exchange heat with the gas, thereby increasing efficiency of the energy storage. A portion of the gas dissolves into the heat-transfer fluid. Gas is exhausted from the cylinder assembly at the second pressure, and at least a portion of the heat-transfer fluid remains in the cylinder assembly. Thereafter, energy is recovered from gas effervescing from the heat-transfer fluid in the cylinder assembly.

Embodiments of the invention may include one or more of the following, in any of a variety of combinations. Energy may be recovered from effervescing gas using a regenerative stroke. During the exhausting of gas from the cylinder assembly, a portion of the gas may be trapped in dead volume in the cylinder assembly, and the regenerative stroke may recover energy from the gas disposed in the dead volume. The cylinder assembly may include a piston within the cylinder assembly, and the energy recovered during the regenerative stroke may drive a mechanism mechanically coupled to the piston and/or a hydraulic system coupled to the cylinder assembly. After energy recovery, additional gas may be introduced at the first pressure into the cylinder assembly, and the additional gas may be compressed from the first pressure to the second pressure. Exhausting gas from the cylinder assembly may include or consist essentially of transferring gas from the cylinder assembly to a compressed-gas reservoir (e.g., a pressure vessel and/or a cavern). Exhausting gas from the cylinder assembly may include or consist essentially of transferring gas from the cylinder assembly to a second cylinder assembly, and gas may be compressed within the second cylinder assembly from the second pressure to a third pressure larger than the second pressure.

The heat-transfer fluid may be introduced into the cylinder assembly at least by spraying. Energy recovery may be terminated when the pressure within the cylinder assembly reaches the first pressure. The first pressure may be approximately atmospheric pressure. The heat-transfer fluid may be conditioned to reduce solubility of the gas in the heat-transfer fluid and/or reduce the rate of dissolution of the gas into the heat-transfer fluid. Conditioning may include or consist essentially of heating the heat-transfer fluid to reduce the solubility of the gas in the heat-transfer fluid. The heat-transfer fluid may include a solute therein. The solute may include or consist essentially of a salt (e.g., sodium chloride and/or calcium chloride) and/or a surfactant (e.g., sodium dodecyl sulphate, iso-amyl alcohol, and/or sodium tetradecyl sulphate). The heat-transfer fluid may be heated to increase the solubility of the solute in the heat-transfer fluid.

Prior to compression, gas may be introduced at the first pressure into the cylinder assembly substantially isobarically, and during the introduction, heat-transfer fluid may not be introduced into the cylinder assembly. Gas may be exhausted from the cylinder assembly substantially isobarically, and during the exhausting, heat-transfer fluid may not be introduced into the cylinder assembly. Energy stored during compression of the gas may originate from an intermittent renewable energy source (e.g., of wind or solar energy), and gas may be expanded within the cylinder assembly to recover energy when the intermittent renewable energy source is nonfunctional.

The heat-transfer fluid may include an additive to reduce the surface tension of the heat-transfer fluid. The additive may include or consist essentially of a surfactant, e.g., a low-foaming surfactant, and may also include a defoaming agent. The heat-transfer fluid may be introduced into the cylinder assembly as a spray, and the injection velocity of the spray may be less than the injection velocity required to form a spray from the heat-transfer fluid without the additive. Heat exchange between the heat-transfer fluid and the gas may render the compression of the gas substantially isothermal. The heat-transfer fluid may include or consist essentially of water.

In another aspect, embodiments of the invention feature a method for improving efficiency of a compressed-gas energy storage and recovery system that includes providing a heat-transfer fluid conditioned to reduce the solubility of a gas in the heat-transfer fluid and/or reduce the rate of dissolution of a gas into the heat-transfer fluid. Gas is compressed to store energy and/or gas is expanded to recover energy, and during the compression and/or expansion, heat is exchanged between the gas and the conditioned heat-transfer fluid, thereby increasing efficiency of the energy storage and recovery.

Embodiments of the invention may include one or more of the following, in any of a variety of combinations. The conditioned heat-transfer fluid may include a solute therein. The solute may include or consist essentially of a salt (e.g., sodium chloride and/or calcium chloride) and/or a surfactant (e.g., sodium dodecyl sulphate, iso-amyl alcohol, and/or sodium tetradecyl sulphate). The solute may reduce the surface tension of the heat-transfer fluid. Exchanging heat between the gas and the conditioned heat-transfer fluid may include or consist essentially of spraying the conditioned heat-transfer fluid into the gas, and the injection velocity of the spraying may be less than the injection velocity required to form a spray from the heat-transfer fluid without the solute. The conditioned heat-transfer fluid may be heated to increase the solubility of the solute in the conditioned heat-transfer fluid.

Expanded gas may be vented to atmosphere, and/or compressed gas may be stored in a compressed-gas reservoir. Energy stored during compression of the gas may originate from an intermittent renewable energy source (e.g., of wind or solar energy), and energy may be recovered via expansion of the gas when the intermittent renewable energy source is nonfunctional. Exchanging heat between the gas and the conditioned heat-transfer fluid may include or consist essentially of spraying the conditioned heat-transfer fluid into the gas. The heat exchange between the gas and the conditioned heat-transfer fluid may render the compression and/or expansion substantially isothermal. The gas may be compressed and/or expanded within a cylinder assembly. Prior to the compression and/or expansion, the gas may be introduced into the cylinder assembly substantially isobarically, and heat may not be exchanged between the gas and the conditioned heat-transfer fluid during the introduction. After the compression and/or expansion, the gas may be exhausted from the cylinder assembly substantially isobarically, and heat may not be exchanged between the gas and the conditioned heat-transfer fluid during the exhausting of the gas. The heat-transfer fluid may include or consist essentially of water.

In yet another aspect, embodiments of the invention feature a method for improving efficiency of a compressed-gas energy storage and recovery system. Gas may be compressed to store energy and/or expanded to recover energy within a cylinder assembly. During the compression and/or expansion, heat may be exchanged between the gas and a heat-transfer fluid, thereby increasing efficiency of the energy storage and recovery. Prior to the compression and/or expansion, the gas may be introduced into the cylinder assembly substantially isobarically, and heat may not be exchanged between the gas and the heat-transfer fluid during the introduction. After the compression and/or expansion, the gas may be exhausted from the cylinder assembly substantially isobarically, and heat may not be exchanged between the gas and the heat-transfer fluid during the exhausting of the gas.

Embodiments of the invention may include one or more of the following, in any of a variety of combinations. Exhausting gas from the cylinder assembly may include or consist essentially of transferring gas from the cylinder assembly to a compressed-gas reservoir (e.g., a pressure vessel and/or a cavern). Exhausting gas from the cylinder assembly may include or consist essentially of transferring gas from the cylinder assembly to a second cylinder assembly. Gas may be compressed and/or expanded within the second cylinder assembly over a pressure range different from the pressure range of compressing or expanding gas within the cylinder assembly. Exchanging heat between the gas and the heat-transfer fluid may include or consist essentially of spraying the heat-transfer fluid into the gas. The heat-transfer fluid may be heated to reduce the solubility of the gas in the heat-transfer fluid. Energy stored during compression of the gas may originate from an intermittent renewable energy source (e.g., of wind or solar energy), and energy may be recovered via expansion of the gas when the intermittent renewable energy source is nonfunctional.

The heat-transfer fluid may include an additive to reduce its surface tension, and the additive may include or consist essentially of a surfactant (e.g., a low-foaming surfactant). The additive may also include a defoaming agent. Exchanging heat between the gas and the heat-transfer fluid may include or consist essentially of spraying the heat-transfer fluid into the gas, and the injection velocity of the spraying may be less than the injection velocity required to form a spray from the heat-transfer fluid without the additive. The heat exchange between the heat-transfer fluid and the gas may render the compression of the gas substantially isothermal. The heat-transfer fluid may include or consist essentially of water.

In a further aspect, various embodiments of the invention feature a method for improving efficiency of a compressed-gas energy storage and recovery system that includes providing a heat-transfer fluid including an additive for reducing its surface tension. Gas is compressed to store energy and/or expanded to recover energy, and during the compression and/or expansion, heat is exchanged between the gas and the additive-containing heat-transfer fluid, thereby increasing efficiency of the energy storage and recovery.

Embodiments of the invention may feature one or more of the following in any of a variety of combinations. Energy stored during compression of the gas may originate from an intermittent renewable energy source (e.g., of wind or solar energy), and energy may be recovered via expansion of the gas when the intermittent renewable energy source is nonfunctional. Expanded gas may be vented to atmosphere, and/or compressed gas may be stored in a compressed-gas reservoir. The additive-containing heat-transfer fluid may be heated to reduce the solubility of the gas in the heat-transfer fluid. The additive may include or consist essentially of a surfactant (e.g., sodium dodecyl sulphate, iso-amyl alcohol, and/or sodium tetradecyl sulphate). The surfactant may be a low-foaming surfactant. The additive may further include a defoaming agent. Exchanging heat between the gas and the additive-containing heat-transfer fluid may include or consist essentially of spraying the additive-containing heat-transfer fluid into the gas, and the injection velocity of the spraying may be less than the injection velocity required to form a spray from the heat-transfer fluid without the additive. The heat exchange between the additive-containing heat-transfer fluid and the gas may render the compression of the gas substantially isothermal. The heat-transfer fluid may include or consist essentially of water.

In yet a further aspect, embodiments of the invention feature a compressed-gas energy storage and recovery system including or consisting essentially of a cylinder assembly for compressing gas to store energy and expanding gas to recover energy, a heat-transfer subsystem, and a control system. The cylinder assembly includes or consists essentially of two separated chambers. The heat-transfer system introduces heat-transfer fluid within the cylinder assembly to exchange heat with gas in the cylinder assembly, thereby increasing efficiency of the energy storage and recovery. The control system directs the cylinder assembly to compress gas and thereafter to recover energy from gas effervescing from the heat-transfer fluid in the cylinder assembly.

Embodiments of the invention may include one or more of the following, in any of a variety of combinations. The control system may direct performance of a compression stroke to compress the gas and a regenerative stroke to recover the energy. The control system may control the cylinder assembly and the heat-transfer subsystem to enforce substantially isothermal compression and expansion of gas in the cylinder assembly. A compressed-gas reservoir for storage of gas after compression and supply of compressed gas for expansion may be selectively fluidly connected to the cylinder assembly. A vent for exhausting expanded gas to atmosphere and supply of gas for compression may be selectively fluidly connected to the cylinder assembly. An intermittent renewable energy source (e.g., of wind or solar energy) may be connected to the cylinder assembly. Energy stored during compression of the gas may originate from the intermittent renewable energy source, and energy may be recovered via expansion of the gas when the intermittent renewable energy source is nonfunctional. The heat-transfer subsystem may include a circulation apparatus for circulating a heat-transfer fluid through the cylinder assembly. The heat-transfer subsystem may include a mechanism (e.g., a spray head and/or a spray rod) disposed within the cylinder assembly for introducing the heat-transfer fluid. The heat-transfer subsystem may include or consist essentially of a heat exchanger and a circulation apparatus for circulating gas from the cylinder assembly through the heat exchanger and back to the cylinder assembly. The two separated chambers may be a pneumatic chamber and a hydraulic chamber, or both chambers may be pneumatic chambers. A movable boundary mechanism (e.g., a piston) may separate the two chambers, and a crankshaft for converting reciprocal motion of the boundary mechanism into rotary motion may be mechanically coupled to the boundary mechanism. A motor/generator may be coupled to the crankshaft. The system may include a sensor for detecting a pressure within the cylinder assembly, and the control system may be responsive to the sensor.

In another aspect, embodiments of the invention feature a compressed-gas energy storage and recovery system including or consisting essentially of a cylinder assembly for compressing gas to store energy and expanding gas to recover energy, a spray mechanism, and a control system. The cylinder assembly includes or consists essentially of two separated chambers. The spray mechanism introduces a spray of heat-transfer fluid within the cylinder assembly to exchange heat with gas in the cylinder assembly, thereby increasing efficiency of the energy storage and recovery. The control system controls the velocity of the spray based at least in part on the surface tension of the heat-transfer fluid.

Embodiments of the invention feature one or more of the following in any of a variety of combinations. The control system may control the cylinder assembly and the spray mechanism to enforce substantially isothermal compression and expansion of gas in the cylinder assembly. A compressed-gas reservoir for storage of gas after compression and supply of compressed gas for expansion may be selectively fluidly connected to the cylinder assembly. A vent for exhausting expanded gas to atmosphere and supply of gas for compression may be selectively fluidly connected to the cylinder assembly. An intermittent renewable energy source (e.g., of wind or solar energy) may be connected to the cylinder assembly. Energy stored during compression of the gas may originate from the intermittent renewable energy source, and energy may be recovered via expansion of the gas when the intermittent renewable energy source is nonfunctional. The spray mechanism may include or consist essentially of a spray head and/or a spray rod. The system may include a circulation apparatus for circulating the heat-transfer fluid to the spray mechanism. The system may include a heat exchanger for maintaining the heat-transfer fluid at a substantially constant temperature, and the circulation apparatus may circulate heat-transfer fluid from the cylinder assembly through the heat exchanger and back to the cylinder assembly. The two separated chambers may be a pneumatic chamber and a hydraulic chamber, or both chambers may be pneumatic chambers. A movable boundary mechanism (e.g., a piston) may separate the two chambers, and a crankshaft for converting reciprocal motion of the boundary mechanism into rotary motion may be mechanically coupled to the boundary mechanism. A motor/generator may be coupled to the crankshaft.

The system may include a heat-transfer fluid for spraying through the spray mechanism. The heat-transfer fluid may include an additive for reducing the surface tension of the heat-transfer fluid. The additive may include or consist essentially of a surfactant (e.g., sodium dodecyl sulphate, iso-amyl alcohol, and/or sodium tetradecyl sulphate). The surfactant may be a low-foaming surfactant. The additive may further include a defoaming agent. The heat-transfer fluid may include or consist essentially of water.

In yet another aspect, embodiments of the invention feature a compressed-gas energy storage and recovery system including or consisting essentially of a cylinder assembly for compressing gas to store energy and expanding gas to recover energy, a heat-transfer subsystem, and a control system. The cylinder assembly includes or consists essentially of two separated chambers and a mechanism for controlling the introduction of gas into and exhausting of gas out of the cylinder assembly. The heat-transfer subsystem introduces heat-transfer fluid within the cylinder assembly to exchange heat with gas in the cylinder assembly, thereby increasing efficiency of the energy storage and recovery. The control system causes the heat-transfer subsystem to introduce heat-transfer fluid within the cylinder assembly during compression and expansion of the gas, and it prevents the heat-transfer subsystem from introducing heat-transfer fluid within the cylinder assembly when the mechanism is allowing introduction of gas into or exhausting gas out of the cylinder assembly.

Embodiments of the invention feature one or more of the following in any of a variety of combinations. The control system may control the cylinder assembly and the heat-transfer subsystem to enforce substantially isothermal compression and expansion of gas in the cylinder assembly. A compressed-gas reservoir for storage of gas after compression and supply of compressed gas for expansion may be selectively fluidly connected to the cylinder assembly. A vent for exhausting expanded gas to atmosphere and supply of gas for compression may be selectively fluidly connected to the cylinder assembly. An intermittent renewable energy source (e.g., of wind or solar energy) may be connected to the cylinder assembly. Energy stored during compression of the gas may originate from the intermittent renewable energy source, and energy may be recovered via expansion of the gas when the intermittent renewable energy source is nonfunctional. The heat-transfer subsystem may include a circulation apparatus for circulating heat-transfer fluid through the cylinder assembly. The heat-transfer subsystem may include a mechanism (e.g., a spray head and/or a spray rod) disposed within the cylinder assembly for introducing the heat-transfer fluid. The two separated chambers may be a pneumatic chamber and a hydraulic chamber, or both chambers may be pneumatic chambers. A movable boundary mechanism (e.g., a piston) may separate the two chambers, and a crankshaft for converting reciprocal motion of the boundary mechanism into rotary motion may be mechanically coupled to the boundary mechanism. A motor/generator may be coupled to the crankshaft. The introduction of gas into and exhausting of gas out of the cylinder assembly may be substantially isobaric.

In a further aspect, embodiments of the invention feature a compressed-gas energy storage and recovery system including or consisting essentially of a cylinder assembly for compressing gas to store energy and expanding gas to recover energy, a heat-transfer fluid, and a heat-transfer subsystem for introducing the heat-transfer fluid within the cylinder assembly to exchange heat with gas in the cylinder assembly, thereby increasing efficiency of the energy storage and recovery. The cylinder assembly includes or consists essentially of two separated chambers. The heat-transfer fluid includes a solute for reducing the solubility of the gas in the heat-transfer fluid and/or reducing the rate of dissolution of the gas into the heat-transfer fluid.

Embodiments of the invention feature one or more of the following in any of a variety of combinations. A compressed-gas reservoir for storage of gas after compression and supply of compressed gas for expansion may be selectively fluidly connected to the cylinder assembly. A vent for exhausting expanded gas to atmosphere and supply of gas for compression may be selectively fluidly connected to the cylinder assembly. An intermittent renewable energy source (e.g., of wind or solar energy) may be connected to the cylinder assembly. Energy stored during compression of the gas may originate from the intermittent renewable energy source, and energy may be recovered via expansion of the gas when the intermittent renewable energy source is nonfunctional. The heat-transfer subsystem may include a mechanism (e.g., a spray head and/or a spray rod) disposed within the cylinder assembly for introducing the heat-transfer fluid. The heat-transfer subsystem may include a circulation apparatus for circulating heat-transfer fluid through the cylinder assembly. The heat-transfer subsystem may include a heat exchanger for maintaining the heat-transfer fluid at a substantially constant temperature. The circulation apparatus may circulate heat-transfer fluid from the cylinder assembly through the heat exchanger and back to the cylinder assembly. The two separated chambers may be a pneumatic chamber and a hydraulic chamber, or both chambers may be pneumatic chambers. A movable boundary mechanism (e.g., a piston) may separate the two chambers, and a crankshaft for converting reciprocal motion of the boundary mechanism into rotary motion may be mechanically coupled to the boundary mechanism. A motor/generator may be coupled to the crankshaft.

The solute may include or consist essentially of a salt (e.g., sodium chloride and/or calcium chloride) and/or a surfactant (e.g., sodium dodecyl sulphate, iso-amyl alcohol, and/or sodium tetradecyl sulphate). The solute may reduce the surface tension of the heat-transfer fluid. The heat-transfer fluid may include or consist essentially of water.

In yet a further aspect, embodiments of the invention feature a compressed-gas energy storage and recovery system including or consisting essentially of a cylinder assembly for compressing gas to store energy and expanding gas to recover energy, a heat-transfer fluid, and a spray mechanism for introducing a spray of the heat-transfer fluid within the cylinder assembly to exchange heat with gas therein, thereby increasing efficiency of the energy storage and recovery. The cylinder assembly includes or consists essentially of two separated chambers. The heat-transfer fluid includes an additive for reducing its surface tension.

Embodiments of the invention may include one or more of the following, in any of a variety of combinations. A compressed-gas reservoir for storage of gas after compression and supply of compressed gas for expansion may be selectively fluidly connected to the cylinder assembly. A vent for exhausting expanded gas to atmosphere and supply of gas for compression may be selectively fluidly connected to the cylinder assembly. An intermittent renewable energy source (e.g., of wind or solar energy) may be connected to the cylinder assembly. Energy stored during compression of the gas may originate from the intermittent renewable energy source, and energy may be recovered via expansion of the gas when the intermittent renewable energy source is nonfunctional. The spray mechanism may include or consist essentially of a spray head and/or a spray rod. The system may include a circulation apparatus for circulating heat-transfer fluid through the cylinder assembly. The system may include a heat exchanger for maintaining the heat-transfer fluid at a substantially constant temperature, and the circulation apparatus may circulate heat-transfer fluid from the cylinder assembly through the heat exchanger and back to the cylinder assembly. The two separated chambers may be a pneumatic chamber and a hydraulic chamber, or both chambers may be pneumatic chambers. A movable boundary mechanism (e.g., a piston) may separate the two chambers, and a crankshaft for converting reciprocal motion of the boundary mechanism into rotary motion may be mechanically coupled to the boundary mechanism. A motor/generator may be coupled to the crankshaft.

The additive may include or consist essentially of a surfactant (e.g., sodium dodecyl sulphate, iso-amyl alcohol, and/or sodium tetradecyl sulphate). The surfactant may be a low-foaming surfactant. The additive may further include a defoaming agent. The heat-transfer fluid may include or consist essentially of water. The system may include a control system for controlling the injection velocity of the spray of heat-transfer fluid, e.g., based on the surface tension of the heat-transfer fluid.

These and other objects, along with advantages and features of the invention, will become more apparent through reference to the following description, the accompanying drawings, and the claims. Furthermore, it is to be understood that the features of the various embodiments described herein are not mutually exclusive and can exist in various combinations and permutations. Note that as used herein, the terms "pipe," "piping" and the like shall refer to one or more conduits that are rated to carry gas or liquid between two points. Thus, the singular term should be taken to include a plurality of parallel conduits where appropriate. Herein, the terms "liquid" and "water" interchangeably connote any mostly or substantially incompressible liquid, the terms "gas" and "air" are used interchangeably, and the term "fluid" may refer to a liquid or a gas unless otherwise indicated. As used herein unless otherwise indicated, the term "substantially" means±10%, and, in some embodiments, ±5%. A "valve" is any mechanism or component for controlling fluid communication between fluid paths or reservoirs, or for selectively permitting control or venting. The term "cylinder" refers to a chamber, of uniform but not necessarily circular cross-section, which may contain a slidably disposed piston or other mechanism that separates the fluid on one side of the chamber from that on the other, preventing fluid movement from one side of the chamber to the other while allowing the transfer of force/pressure from one side of the chamber to the next or to a mechanism outside the chamber. A "cylinder assembly" may be a simple cylinder or include multiple cylinders, and may or may not have additional associated components (such as mechanical linkages among the cylinders). The shaft of a cylinder may be coupled hydraulically or mechanically to a mechanical load (e.g., a hydraulic motor/pump or a crankshaft) that is in turn coupled to an electrical load (e.g., rotary or linear electric motor/generator attached to power electronics and/or directly to the grid or other loads), as described in the '595 and '853 applications.

BRIEF DESCRIPTION OF THE DRAWINGS

In the drawings, like reference characters generally refer to the same parts throughout the different views. Cylinders, rods, and other components are depicted in cross section in a manner that will be intelligible to all persons familiar with the art of pneumatic and hydraulic cylinders. Also, the drawings are not necessarily to scale, emphasis instead generally being placed upon illustrating the principles of the invention. In the following description, various embodiments of the present invention are described with reference to the following drawings, in which.

DETAILED DESCRIPTION

Figure 1:
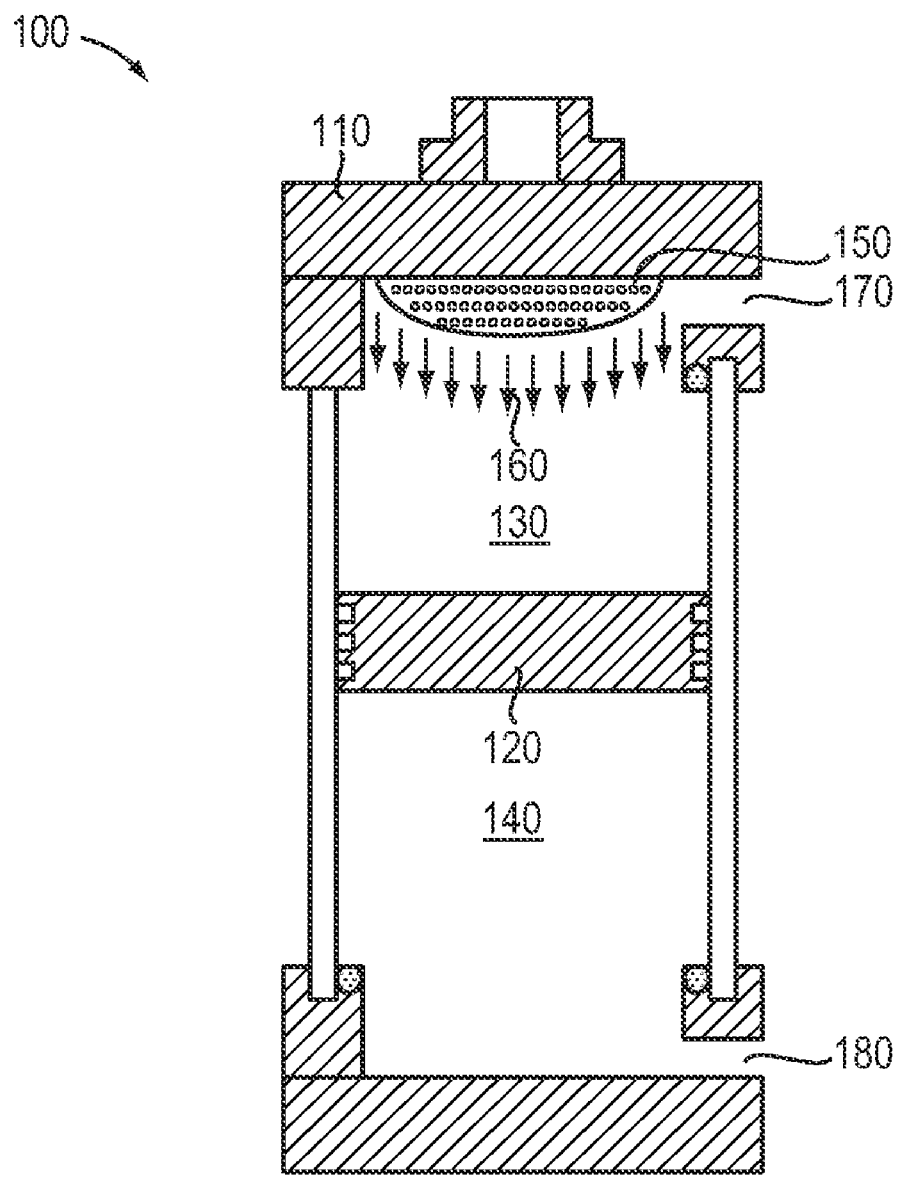
FIG. 1 is a schematic cross-section of a cylinder for compressing or expanding air in accordance with various embodiments of the invention.
Figure 3:
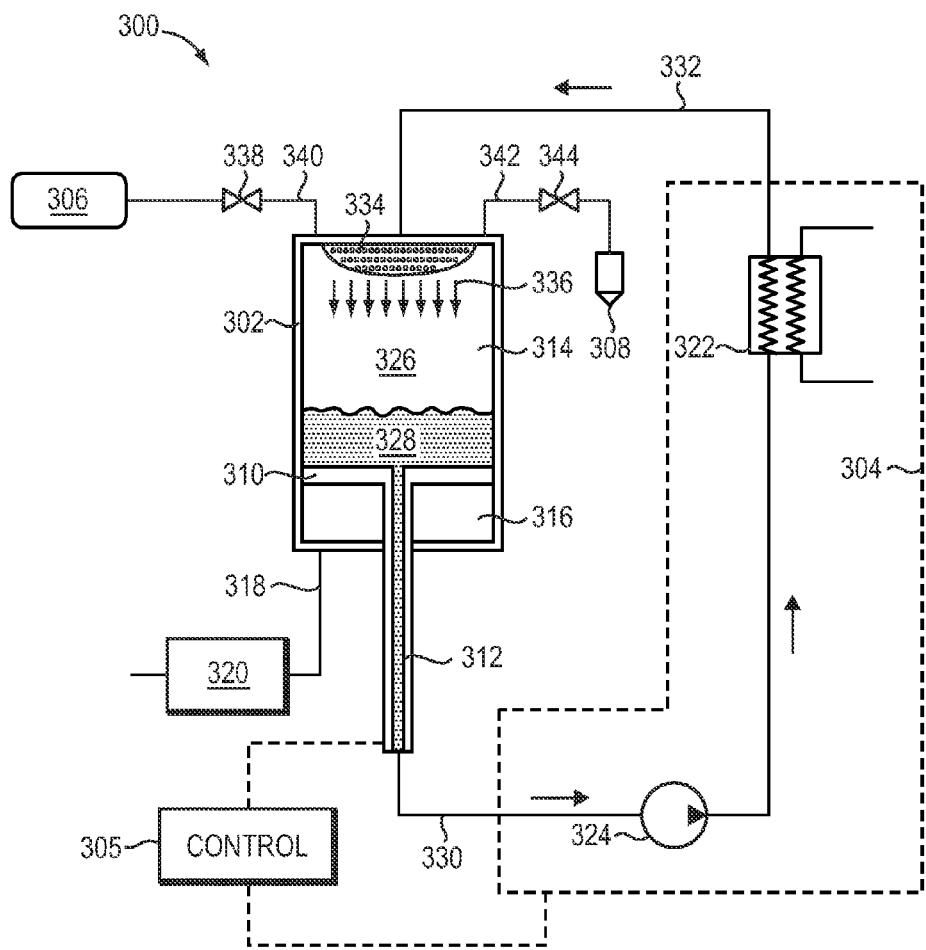
FIG. 3 is a schematic cross-section of a cylinder with a closed-loop liquid-injection system within a compressed-air energy storage and recovery system in accordance with various embodiments of the invention.

FIG. 1 is a schematic representation of a system 100 that includes a vertically-oriented cylinder 110 containing a mobile piston 120 that divides the interior of the cylinder 110 into a pneumatic (i.e., typically gas-filled) chamber 130 and a second chamber 140. The second chamber 140 may also be pneumatic, or, alternatively, may be hydraulic (i.e., typically liquid-filled). The system 100 is an illustrative example of a device or class of devices in which embodiments of the invention may be employed. A spray head 150 injects a spray 160 of liquid droplets into the upper chamber 130 of the cylinder 110. This spray 160 may produce an accumulation of liquid (not shown) on top of piston 120. A port or ports 170 with associated pipes and valves (not shown) enables gas to be admitted to or exhausted from chamber 130 as desired. Port or ports 170 may communicate through pipes and valves (not depicted, but see, e.g., the '703 application or FIG. 3) to place chamber 130 in fluid communication with ambient air, a storage vessel (not depicted) containing pressurized gas, or a chamber within another cylinder (not depicted). A port or ports 180 with associated pipes and valves (not shown) enables fluid to be admitted to or withdrawn from chamber 140 as desired.

During air expansion, gas in chamber 130 expands, performing work on piston 120, which in turn performs work on the fluid in chamber 140, forcing the fluid out through port 180. As the gas in chamber 130 expands, its temperature tends to fall according to the ideal gas law. If during expansion the spray 160 enters chamber 130 at a suitable temperature (e.g., the temperature of the gas in chamber 130 before compression begins), then the spray 160 is at a higher temperature during expansion than the gas in chamber 130, and the spray 160 transfers thermal energy to the gas in chamber 130. The transfer of thermal energy from the spray 160 to the gas in chamber 130 will increase the amount of work performed by the expanding gas on the piston 120. In effect, this transfer of thermal energy from the spray 160 to the gas in chamber 130 enables the conversion of some of the thermal energy in the spray 160 into work.

During air compression, liquid flows through port 180 into chamber 140, forcing piston 120 upward and thus compressing the gas in chamber 130. While the gas in chamber 130 is being compressed by the piston 120, its temperature tends to rise (again, according to the ideal gas law). If during compression the liquid spray 160 enters chamber 130 at a suitable temperature (e.g., the temperature of the gas in chamber 130 before compression begins), then the gas in chamber 130 will be at a higher temperature during compression than the spray 160, and the gas in chamber 130 will transfer thermal energy to the spray 160. The transfer of thermal energy to the spray 160 from the gas in chamber 130 will reduce the amount of work that the piston 120 must perform on the gas in chamber 130 in order to compress the gas.

During expansion, if some of the gas in chamber 130 dissolves into the liquid introduced into chamber 130 as spray 160, then the pressure of the remaining, undissolved gas in chamber 130 will be lower than if no dissolution occurred. During expansion, this loss of pressure will reduce the amount of work performed by the gas in chamber 130 on the piston 120. In effect, some of the work theoretically available from the pressurized gas introduced into chamber 130 will have been expended on forcing gas into solution, and will not be extracted from the gas as work.

During compression, if some of the gas in chamber 130 dissolves into the liquid introduced into chamber 130 as a spray 160, then less gas will be available to pass through port or ports 170 to an external storage vessel. In effect, some of the work performed by piston 120 on the contents of chamber 130 will have been expended on forcing gas into solution, and will not be stored in the external storage vessel (or transferred to another cylinder) as pressure potential energy.

The loss of energy to gas dissolution during either expansion or compression may advantageously be mitigated utilizing various embodiments of the present invention. The solubility of a gas in a liquid is approximately described by Henry's law, which may in one form be stated as $c = p \times k_H$, where c is the concentration of the gas (solute) in the liquid, p is the partial pressure of the gas above the liquid (solvent), and $k_H$ is Henry's coefficient (units of L·atm/mol). Henry's law implies that at a given temperature, the solubility of a gas in a liquid solution is directly proportional to the liquid's partial pressure. Henry's coefficient $k_H$ depends on the temperature of the system, the identity of the solvent, the identity of the solute, and other factors. For example, in aqueous solutions, the solubility of air tends to decrease with increasing temperature (i.e., Henry's coefficient tends to decrease). The accuracy of these statements and of other statements herein regarding the solubility of gases and other substances will be clear to any person familiar with the art of physical chemistry.

Figure 2:
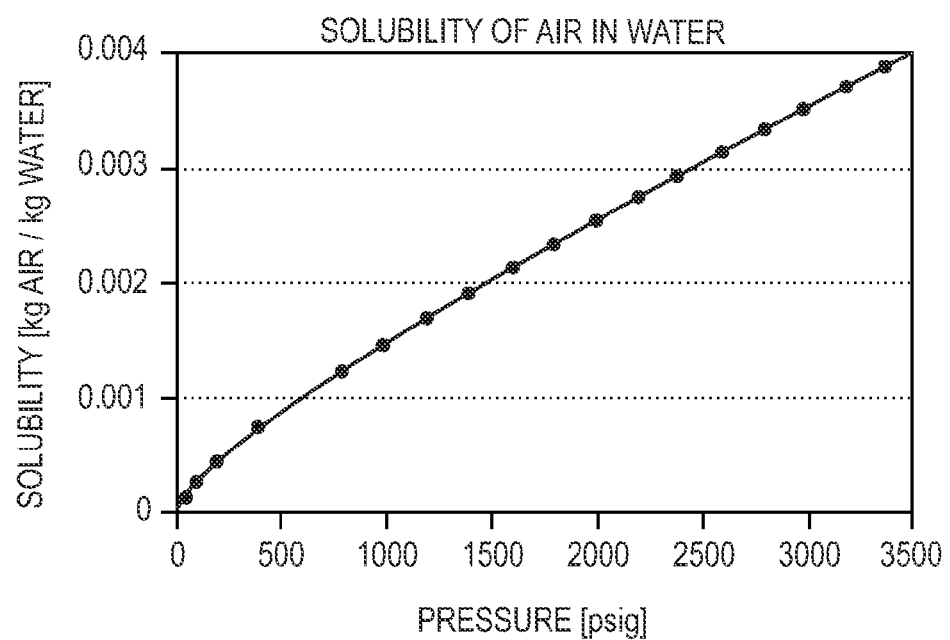
FIG. 2 is a chart depicting the solubility of air in water as a function of pressure.

FIG. 2 is a graph of the steady-state solubility of air in water over a range of pressures at a fixed temperature (25° C.), based on data from V. I. Baranenko et al., "Solubility of oxygen and carbon dioxide in water," translated from *Atomnaya Énergiya*, Vol. 68, No. 4, pp. 291-294, April, 1990 and W. Eichelberger, "Solubility of Air in Brine at High Pressures," *Industrial and Engineering Chemistry* vol. 47, No. 10, pp 2223-2228 (October 1955), the entire disclosure of which is incorporated by reference herein. As shown, the solubility of air in water increases in approximately direct proportion to pressure, as predicted by Henry's law. In FIG. 2, the instantaneous slope of the line is Henry's coefficient, which decreases slightly with increasing pressure.

FIG. 2 indicates that a greater mass of gas will tend to be dissolved in a given amount of heat-transfer liquid at higher pressures. For example, doubling the pressure will approximately double the steady-state quantity of gas dissolved in a given quantity of heat-transfer liquid at a given temperature.

Additionally, when a given volume of liquid is reduced to N spherical droplets, the total surface area of the liquid is increased in proportion to $N^{2/3}$. Therefore, in a system employing liquid sprays in high-pressure gas to achieve heat transfer, a large liquid-gas surface area generally exists. Indeed, one purpose of generating a spray is to create this large surface area in order to expedite heat transfer between the liquid and the gas. As a side effect, this large surface area also expedites dissolution of the gas in the liquid and evaporation of the liquid into the gas. The amount of gas dissolved in the liquid may thus, after the spray is produced, rapidly approximate the steady-state maximum predicted by Henry's law. That is, the heat-transfer liquid will tend to rapidly become a saturated solution with respect to the gas with which it is in contact.

Embodiments of the invention include methods to reduce the effect of gas-in-liquid solubility on a spray-based isothermal compressed air energy storage system by reducing the solubility of air (or other gas) in the heat-transfer fluid (e.g., water). Such methods may include or consist essentially of (1) adding one or more solutes to the water that decrease Henry's coefficient (i.e., reduce the solubility of air in water) and/or decrease the speed with which air dissolves in water; (2) increasing the operating temperature of the compressed-air energy storage system in order to decrease Henry's coefficient; (3) operating the system so as to shorten the time during which liquid and gas are in contact with each other; and/or (4) operating the system during compression so as to recover energy from dissolved gas via a regenerative piston stroke.

Solubility of a gas in a liquid may be altered by the presence of additional solutes, such as salts, in the solution. In particular, the solubility of several gases, including molecular nitrogen ($N_2$), the most abundant component of air, has been shown to decrease with increasing concentration of salts such as NaCl (sodium chloride) and calcium chloride (CaCl) (see, e.g., Smith, N. O., Kelemen. S., and Nagy. B., "Solubility of natural gases in aqueous salt solutions—I: Nitrogen in aqueous NaCl, $CaCl_2$, $Na_2SO_4$, and $MgSO_4$, at room temperatures and at pressures below 1000 psia," *Geochimica et Cosmochimica Acta* 26:921-926 [1962], the entire disclosure of which is incorporated by reference herein). Solubility of $N_2$ in an aqueous solution may be reduced by 50% or more at a given pressure by the addition of salts to the solution. A similar effect has been documented for many salts and gases, including $O_2$ (the second most abundant component of air): see, e.g., Battino, R. and Clever, H. L., "Solubility of Gases in Liquids," *Chem. Ret.* 66:395-463 (1966), the entire disclosure of which is incorporated by reference herein. The amount of energy lost due to dissolution of air in water in a system employing a water heat-exchange spray in high-pressure air may, therefore, be reduced by 50% or more by the addition of an appropriate solute or solutes, in appropriate concentrations, to the water.

Moreover, surfactants or surface-active-agents (i.e., substances whose molecules, when dissolved in liquid, accumulate preferentially on the surface of the liquid) depress liquid-gas mass transfer by presenting a physical barrier layer. That is, a surfactant slows both evaporation of the liquid into the gas and dissolution of the gas into the liquid. See, e.g., Rosso, D., Huo, D. L., and Stenstrom, M. K., "Effects of interfacial surfactant contamination on bubble gas transfer," *Chemical Engineering Science* 61:5500-5514 (2006), the entire disclosure of which is incorporated by reference herein. Commercially available surfactants such as sodium dodecyl sulphate, iso-amyl alcohol, and sodium tetradecyl sulphate may reduce gas-transfer rates at the gas-water interface by, e.g., up to 70% relative to rates for pure water. Slowing dissolution of air in water prevents dissolved-air saturation of droplets during their time of residence within the air undergoing expansion and/or postpones the onset of saturation from the time of droplet formation. Whether saturation is prevented or merely postponed, more work (during expansion) will be extracted from a given amount of air. (Energy savings may also be realized by these methods during gas compression.) As detailed below, the addition of one or more surfactants to the heat-exchange liquid may also advantageously reduce the liquid's surface tension, thereby reducing the amount of power needed to form an atomized spray of the liquid and increasing overall system efficiency.

The solubility of gas in liquid tends to decrease with increasing temperature (i.e., Henry's coefficient is decreased). In particular, Henry's coefficient as a function of temperature may be approximated as $k_H(T)=k_H(T^S)\exp[C(1/T-1/T^S)]$, where $T^S$=298 K (standard temperature) and C is a constant. Raising the temperature of the air-water mixture will thus decrease the solubility of the air in the water. Simultaneously, raising the temperature increases the solubility of many salts and other solutes in the water. Increased operating temperature therefore may confer a double benefit, lowering Henry's coefficient directly and enabling increased non-gas solute concentrations that may further lower Henry's coefficient. As mentioned above, decreasing Henry's coefficient tends to lower the amount of dissolved air and thus the amount of work lost.

Operation with heat-transfer fluid temperatures slightly higher than ambient, e.g., ranging from approximately 40° C. to approximately 70° C., will typically have little impact on system components and design, but may facilitate improved system efficiency by decreasing the solubility of gases such as air in the heat-transfer fluid. These temperatures are typical for operation of a hydraulic oil pump and most seal technology is stable at these temperatures. With water as the heat-transfer fluid, temperatures up to approximately 100° C. may be approached without boiling the heat-transfer fluid. Heat-transfer fluids may be utilized at temperatures ranging from approximately 70° C. to approximately 90° C., and may be heated to such temperatures via, e.g., cogeneration. For example, waste heat from, e.g., power plants, may be available to pre-heat heat-transfer fluids to such temperatures. Even higher temperatures may be utilized, particularly in conjunction with heat-resistant seals and/or other system components.

During admission of gas into a pneumatic or pneumatic-hydraulic cylinder for expansion of the gas, the initial introduction of the heat-exchange spray into the gas may be postponed as long as additional gas is being admitted to the chamber (a phase of operation herein referred to as "direct-drive"). Since the direct-drive phase is approximately isobaric (i.e., constant-pressure), heat exchange is generally not required, or is of relatively less importance, to maintain an isothermal gas process, and the heat-exchange spray may be stopped without loss of efficiency. Furthermore, during compression, introduction of the heat-exchange spray into the gas may be terminated when the contents of the compression chamber have approximated the pressure of the gas in the external storage vessel to which the compressed gas is to be directed: a valve may then be opened to allow the pressurized gas to pass approximately isobarically into the storage vessel. During this approximately isobaric transfer of gas, heat exchange is generally not required, or is of relatively less importance, to maintain an isothermal gas process, and the heat-exchange spray may be stopped without loss of efficiency.

Reference is now made to FIG. 3, which illustrates a pneumatic cylinder with a closed-loop water-injection system within a compressed air energy storage and recovery system 300. The system 300 includes a cylinder assembly 302, a heat-transfer subsystem 304, and a control system 305 for controlling operation of the various components of system 300. During system operation, compressed air is either directed into vessel 306 during storage of energy or released from vessel 306 during recovery of stored energy. Vessel 306 may be, e.g., one or more pressure vessels (i.e., containers for compressed gas that may have rigid exteriors or may be inflatable, and that may be formed of various suitable materials such as metal or plastic) or caverns (i.e., naturally occurring or artificially created cavities that are typically located underground). Air is admitted to the system 300 through vent 308 during storage of energy, or exhausted from the system 300 through vent 308 during release of energy.

The control system 305 may be any acceptable control device with a human-machine interface. For example, the control system 305 may include a computer (for example a PC-type) that executes a stored control application in the form of a computer-readable software medium. More generally, control system 305 may be realized as software, hardware, or some combination thereof. For example, control system 305 may be implemented on one or more computers, such as a PC having a CPU board containing one or more processors such as the Pentium, Core, Atom, or Celeron family of processors manufactured by Intel Corporation of Santa Clara, Calif., the 680x0 and POWER PC family of processors manufactured by Motorola Corporation of Schaumburg, Ill., and/or the ATHLON line of processors manufactured by Advanced Micro Devices, Inc., of Sunnyvale, Calif. The processor may also include a main memory unit for storing programs and/or data relating to the methods described above. The memory may include random access memory (RAM), read only memory (ROM), and/or FLASH memory residing on commonly available hardware such as one or more application specific integrated circuits (ASIC), field programmable gate arrays (FPGA), electrically erasable programmable read-only memories (EEPROM), programmable read-only memories (PROM), programmable logic devices (PLD), or read-only memory devices (ROM). In some embodiments, the programs may be provided using external RAM and/or ROM such as optical disks, magnetic disks, or other storage devices.

For embodiments in which the functions of controller 305 are provided by software, the program may be written in any one of a number of high level languages such as FORTRAN, PASCAL, JAVA, C, C++, C#, LISP, PERL, BASIC or any suitable programming language. Additionally, the software can be implemented in an assembly language and/or machine language directed to the microprocessor resident on a target device.

The control system 305 may receive telemetry from sensors monitoring various aspects of the operation of system 300 (as described below), and may provide signals to control valve actuators, valves, motors, and other electromechanical/electronic devices. Control system 305 may communicate with such sensors and/or other components of system 300 via wired or wireless communication. An appropriate interface may be used to convert data from sensors into a form readable by the control system 305 (such as RS-232 or network-based interconnects). Likewise, the interface converts the computer's control signals into a form usable by valves and other actuators to perform an operation. The provision of such interfaces, as well as suitable control programming, is clear to those of ordinary skill in the art and may be provided without undue experimentation.

The cylinder assembly 302 includes a piston 310 slidably disposed therein with a center-drilled rod 312 extending from piston 310 and preferably defining a fluid passageway. The piston 310 divides the cylinder assembly 302 into a first chamber (or "compartment") 314 and a second chamber 316. The rod 312 may be attached to a mechanical load, for example, a crankshaft or hydraulic system (as previously described). Alternatively or in addition, the second chamber 316 may contain hydraulic fluid that is coupled through other pipes 318 and valves to a hydraulic system 320. The heat-transfer subsystem 304 includes or consists essentially of a heat exchanger 322 and a booster-pump assembly 324.

At any time during an expansion or compression phase of gas within the first or upper chamber 314 of the cylinder assembly 302, the chamber 314 will typically contain a gas 326 (e.g., previously admitted from storage vessel 306 during the expansion phase or from vent 308 during the compression phase) and (e.g., an accumulation of) heat-transfer fluid 328 at substantially equal pressure $P_s$ (e.g., up to approximately 3,000 psig). The heat-transfer fluid 328 may be drawn through the center-drilled rod 312 and through a pipe 330 by the pump 324. The pump 324 raises the pressure of the heat-transfer fluid 328 to a pressure $P_t'$ (e.g., up to approximately 3,015 psig) somewhat higher than $P_s$, as described in U.S. patent application Ser. No. 13/009,409, filed on Jan. 19, 2011 (the '409 application), the entire disclosure of which is incorporated by reference herein. The heat-transfer fluid 328 is then sent through the heat exchanger 322, where its temperature is altered, and then through a pipe 332 to a spray mechanism 334 disposed within the cylinder assembly 302. In various embodiments, when the cylinder assembly 302 is operated as an expander, a spray 336 of the heat-transfer fluid 328 is introduced into the cylinder assembly 302 at a higher temperature than the gas 326 and, therefore, transfers thermal energy to the gas 326 and increases the amount of work done by the gas 326 on the piston 310 as the gas 326 expands. In an alternative mode of operation, when the cylinder assembly 302 is operated as a compressor, the heat-transfer fluid 328 is introduced at a lower temperature than the gas 326. Control system 305 may enforce substantially isothermal operation, i.e., expansion and/or compression of gas in cylinder assembly 302, via control over, e.g., the introduction of gas into and the exhausting of gas out of cylinder assembly 302, the rates of compression and/or expansion, and/or the operation of heat-transfer subsystem 304 in response to sensed conditions. For example, control system 305 may be responsive to one or more sensors disposed in or on cylinder assembly 302 for measuring the temperature of the gas and/or the heat-transfer fluid within cylinder assembly 302, responding to deviations in temperature by issuing control signals that operate one or more of the system components noted above to compensate, in real time, for the sensed temperature deviations. For example, in response to a temperature increase within cylinder assembly 302, control system 305 may issue commands to increase the flow rate of spray 336 of heat-transfer fluid 328.

The circulating system 324 described above will typically have higher efficiency than a system which pumps liquid from a low intake pressure (e.g., approximately 0 psig) to $P_t'$, as detailed in the '409 application.

Depending on the current amount of gas saturated in the liquid 328, a certain fraction of gas 326 may dissolve in the liquid 328 as it enters the cylinder assembly 302 as spray 336. In various embodiments, when the cylinder assembly 302 is operated as an expander, this dissolution will reduce the amount of work that may be performed by the gas 326 on the piston 310 and hence on an external mechanical load or provided to the hydraulic system 320. In the case where the dissolved gas does not come out of solution prior to completion of the expansion stroke, but does come out of solution prior to the next expansion stroke, the efficiency of the system 300 will typically be diminished.

At or near the beginning of the expansion stroke, high-pressure gas is admitted into upper chamber 314 of cylinder 302 from the storage vessel 306 via the opening of valve 338, while the piston 310 is forced downward. Assuming that the storage vessel 306 volume is much larger than the volume of cylinder 302, a period of approximately isobaric flow from the storage vessel 306 to chamber 314 may ensue, during which the gas in both the storage vessel 306 and chamber 314 are expanded slightly, and the total mass of gas in the storage vessel 306 is decreased. As most of the gas during this period of approximately isobaric flow (actually slight expansion) is within the storage vessel 306, embodiments of the invention discontinue the heat exchange within the cylinder 302 during this period. That is, during this period of approximately isobaric flow, generation of the heat-exchange spray 336 in cylinder 302 may be ended via control of heat-exchange subsystem 304 by control system 305, thus limiting the quantity of heat-exchange liquid 328 sprayed into chamber 314 and subsequently the amount of gas 326 that dissolves in the liquid 328.

In an alternative mode of operation in accordance with various embodiments, the cylinder assembly 302 is operated as a compressor. For compression, the piston 310 may be impelled by means such as liquid pressurized by the hydraulic system 320 and communicated to chamber 316 through pipe 318 or other mechanical force from an external source (e.g., a crankshaft) communicated mechanically to the piston 310 by shaft 312. When the cylinder assembly 302 is operated as a compressor, depending on the current amount of gas saturated in the liquid 328, a certain fraction of gas 326 may likewise dissolve as the liquid 328 enters the cylinder assembly 302 as a spray 336. This dissolution tends to decrease the mass of free compressed gas at the end of the stroke. The work performed by the piston 310 to compress the portion of the gas that later enters solution may be considered non-useful work by an external mechanical source or the hydraulic system 320 if that energy is not recovered. In the case where the dissolved gas comes out of solution during the next intake stroke such that more gas can enter solution in the next compression stroke, the efficiency of the system 300 will generally be diminished.

At or near the end of the compression stroke, when the gas 326 has been raised to a pressure approximately equal to or slightly higher than that of the gas in the storage vessel 306, valve 338 may be opened while the piston 310 continues to move upward. Assuming that the storage vessel 306 volume is much larger than the cylinder 302 volume, a period of approximately isobaric flow from chamber 314 to the storage vessel 306 may ensue, during which the gas in both the storage vessel 306 and chamber 314 is compressed slightly, and the total mass of gas in the storage vessel 306 is increased. As most of the gas during this period of approximately isobaric flow (actually slight compression) is within the storage vessel 306, embodiments of the invention discontinue the heat exchange within the cylinder 302 during this period. That is, during this period of approximately isobaric flow, generation of the heat-exchange spray 336 may be ended via control of heat-exchange subsystem 304 by control system 305, thus limiting the quantity of heat exchange liquid 328 sprayed into chamber 314 and subsequently the amount of gas 326 that dissolves in the liquid 328.

In both the expansion and compression phases of operation, the addition of one or more selected solutes (e.g., salts and/or surfactants) to the heat transfer fluid 328, with or without operation of the system with its gaseous and liquid contents at a higher temperature, may reduce the quantity of gas 326 that dissolves in the liquid 328 and/or postpone its dissolution, increasing system efficiency. With or without the addition of solutes or the use of higher fluid operating temperatures, during approximately isobaric phases of transfer of gas 326 into or out of the chamber 314 (e.g., out of or into the storage vessel 306), the spray 336 may be terminated, reducing dissolution of gas into liquid.

During the approximately isobaric stage of the compression mode, where compressed gas 326 is transferred to the storage vessel 306, in some instances not all the compressed gas 326 may be successfully transferred. When gas 326 has ceased to flow into the storage vessel 306 and/or piston 310 reaches the top of its stroke, valve 338 is closed. A quantity of gas 326 may remain in the pipes 340, 342 and in any residual gas-filled volume (i.e., dead volume) above the piston 310 within cylinder 302. In addition, the heat-exchange fluid 328 may contain dissolved gas at all points in the loop that circulates the heat-exchange fluid 328. This dissolved gas, as well as the gas in the pipes 340, 342 and in the residual gas-filled volume above piston 310, may not be transferred to the storage vessel 306.

In an operating state subsequent to the completion of a compression stroke in accordance with various embodiments, the upper chamber 314 is to be refilled with environmental air admitted through vent 308. To admit this air, valve 344 is opened and the piston 310 moves downward to the position occupied at the beginning of a compression stroke, refilling chamber 314 with air. If the valve 344 is opened at the top of the stroke, pressurized gas 326 in the pipes 340, 342 and the residual volume above piston 310 exits the system 300 through pipe 342, valve 344, and vent 308, performing work on the environment that is not recovered. As the pressure of the heat-exchange liquid 328 decreases to approximately atmospheric pressure, gas that entered the liquid 328 at high pressure may exit solution and be vented to the environment. This loss of dissolved gas also represents lost work.

The amount of work lost from residual volumes and from gas exiting solution during refilling of the upper chamber 314 of cylinder 302 for a new compression stroke is reduced in accordance with embodiments of the invention. Solutes that reduce the solubility of the gas (e.g., air) in the heat-exchange liquid (e.g., water), and/or that slow the dissolution of the gas in the liquid, may be added to the heat-exchange liquid; liquid and gas may be raised to a higher temperature, also reducing the amount of gas dissolved in the liquid; and/or the system may be operated in such a way as to reduce energy loss from whatever dissolution of gas in liquid does occur. In particular, if in a state subsequent to a compression stroke, while valves 338 and 344 remain closed, the piston 310 is allowed to move downward, the pressurized-fluid contents 326, 328 of the upper chamber 314 of cylinder 302 will perform work on the piston 310. The pressure of the upper chamber 314 declines during this expansion, allowing more gas 326 to effervesce from the liquid 328 (as utilized herein, to "effervesce" means to emerge from solution with liquid, and does not necessarily imply the formation of macroscopic bubbles). The work performed on the piston 310 may be recovered either by attaching a mechanical load to the shaft 312, or by allowing the piston 310 to pressurize liquid in chamber 316 that passes through pipe 318 to the hydraulic system 320, or by both means simultaneously. Such a stroke is herein termed a "regenerative stroke." Control system 305 may initiate a regenerative stroke after one or more (or even every) compression strokes, and control system 305 may terminate a regenerative stroke after the pressure inside upper chamber 314 reaches a desired value (which may be measured by, e.g., one or more sensors disposed in or on cylinder assembly 302 for measuring pressure within cylinder assembly 302). For example, the regenerative stroke may be completed when the contents of chamber 314 have neared or reached approximately atmospheric pressure. In a subsequent state of operation, the valve 344 may be opened and the piston 310 may be moved downward to the position it occupies at the beginning of a compression stroke, filling chamber 314 with gas at substantially atmospheric pressure. The completed regenerative and refill strokes may then be followed by a compression stroke.

The addition of solutes (and/or other additives), the use of a higher operating temperature, the termination of spray generation during isobaric flow, and the performance of a regenerative stroke may be used singly or in any combination to reduce energy losses caused by the dissolution of gas in the heat exchange liquid.

Furthermore, in another mode of operation, where the system 300 is used to expand gas from the vessel 306, the invention may also be employed to reduce energy losses by the dissolution of gas in the heat-exchange liquid. The mechanisms by which energy loss is prevented during this mode of operation are similar to those already described for the mode of operation during which system 300 is used to compress gas.

Furthermore, embodiments of the invention may be applied to systems in which chamber 314 is in fluid communication through pipe 340 and valve 338 with a pneumatic chamber of a second cylinder (rather than with vessel 306). That second cylinder, in turn, may communicate similarly with a third cylinder, and so forth. Any number of cylinders may be linked in this way. These cylinders may be connected in parallel or in a series configuration, where the compression and expansion is done in multiple stages. In a multiple stage expander, for example, the regenerative stroke may be terminated when the pressure in the next stage is equal to the pressure in the previous stage.

Figure 4A:
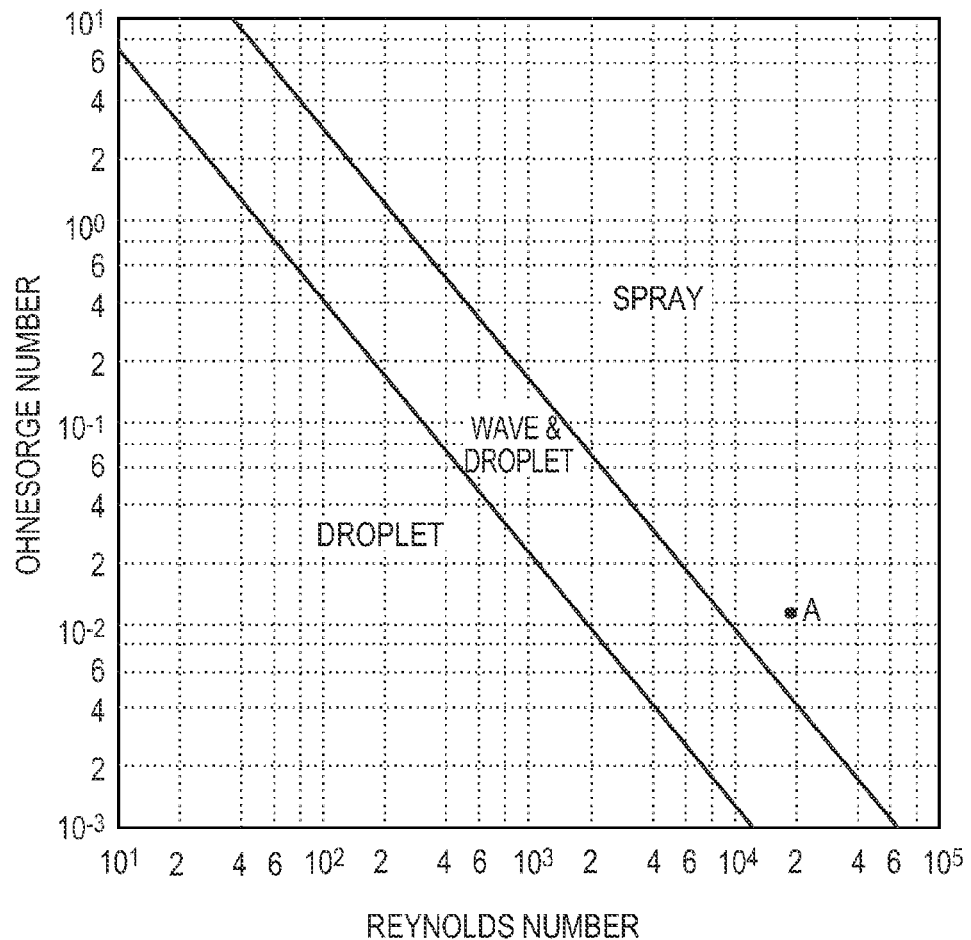
FIG. 4A is a chart showing the relationship of liquid-flow breakup to two dimensionless constants, with one operating point indicated.

The efficiency of compressed-gas energy storage and recovery systems incorporating liquid-based heat exchange may also be advantageously increased by increasing the heat-transfer potential of the heat-exchange liquid. FIG. 4A is a chart adapted from the Ohnesorge reference showing the relationship of liquid-flow breakup to two dimensionless constants, the Ohnesorge number and the Reynolds number. A liquid-injection operating point in the spray (atomization) regime is indicated as operating point (A) in a system for injecting a liquid spray through an orifice into a volume of gas (such as system 300), in accordance with various embodiments of the invention. The horizontal axis of the chart in FIG. 4A corresponds to the Reynolds number of the injected liquid, which is a function of orifice diameter, liquid velocity at exit from orifice, liquid density, and liquid dynamic viscosity. The vertical axis corresponds to the Ohnesorge number of the injected liquid, which is a function of liquid dynamic viscosity, surface tension, density, and orifice diameter. In this illustrative embodiment, at operating state A the Reynolds number is approximately $2 \times 10^4$ and the Ohnesorge number is approximately $1 \times 10^{-2}$. No surfactant has been added to the liquid (e.g., pure water) in operating state A.

Figure 4B:
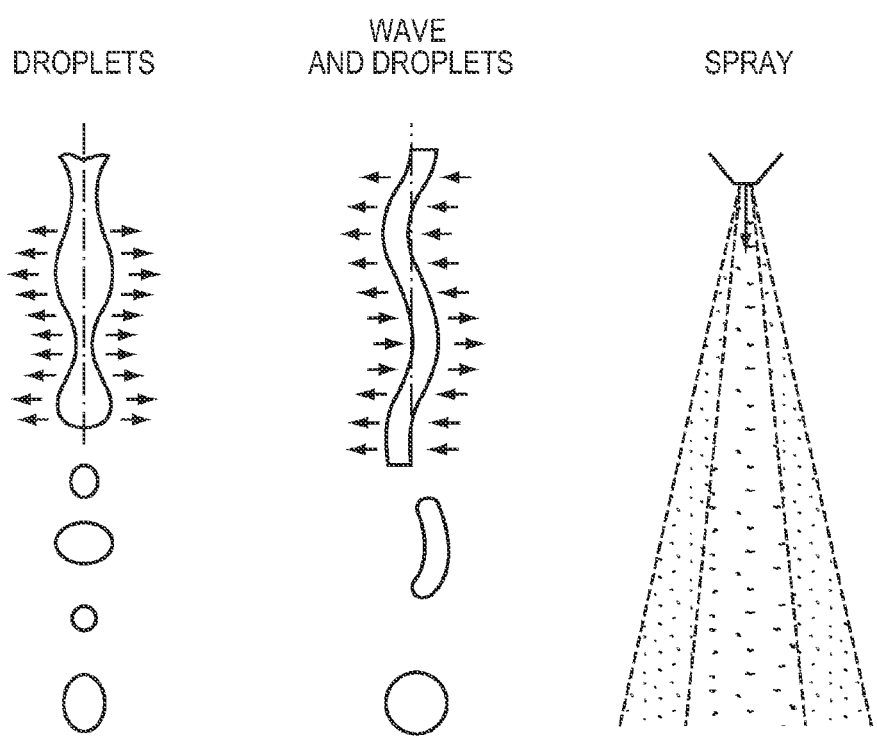
FIG. 4B illustrates three types of liquid-flow breakup.

FIG. 4B is a chart adapted from the Ohnesorge reference illustrating the three liquid spray regions listed in FIG. 4A, i.e., (i) droplet, (ii) wave and droplets, and (iii) spray. To minimize individual drop sizing and optimize heat transfer, spray (atomization) of the liquid is generally desired, as previously described.

Figure 5:
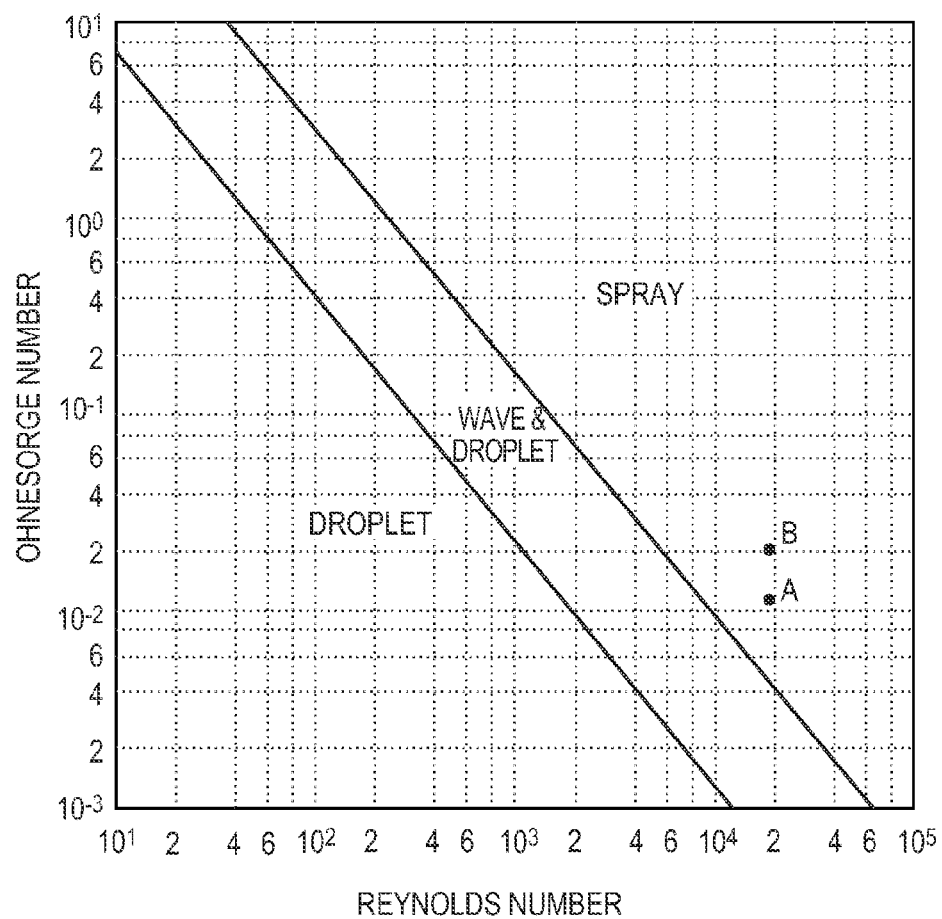
FIG. 5 is a chart showing the relationship of liquid-flow breakup to two dimensionless constants, with two operating points indicated.

FIG. 5 is the same chart as FIG. 4A showing a second operating state (B) in which the Ohnesorge number of the injected liquid of the illustrative embodiment is increased by the addition of a chemical (e.g., a surfactant) to the liquid, thereby reducing the surface tension of the liquid. All other variables have been held constant. Operating state A is also indicated for comparison. In this illustrative case, the surface tension of the liquid has been reduced to one-third of the value for the pure liquid, increasing the Ohnesorge number by a factor of $3^{1/2}$, i.e., from approximately $1 \times 10^{-2}$ to approximately $1.73 \times 10^{-2}$. This degree of reduction in surface tension is readily achievable in water with existing surfactants, e.g., commercially available surfactants such as sodium dodecyl sulphate, iso-amyl alcohol, and sodium tetradecyl sulphate.

Large amounts of foaming in the system may be undesirable, as they might have undesirable effects such as impeding air circulation and droplet movement (and thus heat transfer). They may also become entrained in liquid flows and cause pump cavitation. Therefore, a low-foaming industrial surfactant is utilized in some embodiments of the invention. Industrially available low-foaming surfactants include, but are not limited to, the Pluronic®, Plurafac®, and Degressal® surfactants manufactured by the BASF Group and the Tergitol™ L-64 and L-64 E high-temperature, low-foaming surfactants manufactured by the Dow Chemical Company. A low-foaming surfactant or combination of surfactants may also be combined with a defoaming agent or combination of defoaming agents, such as the Tramfloc® series of antifoams and defoamers manufactured by Tramfloc, Inc.

Figure 6:
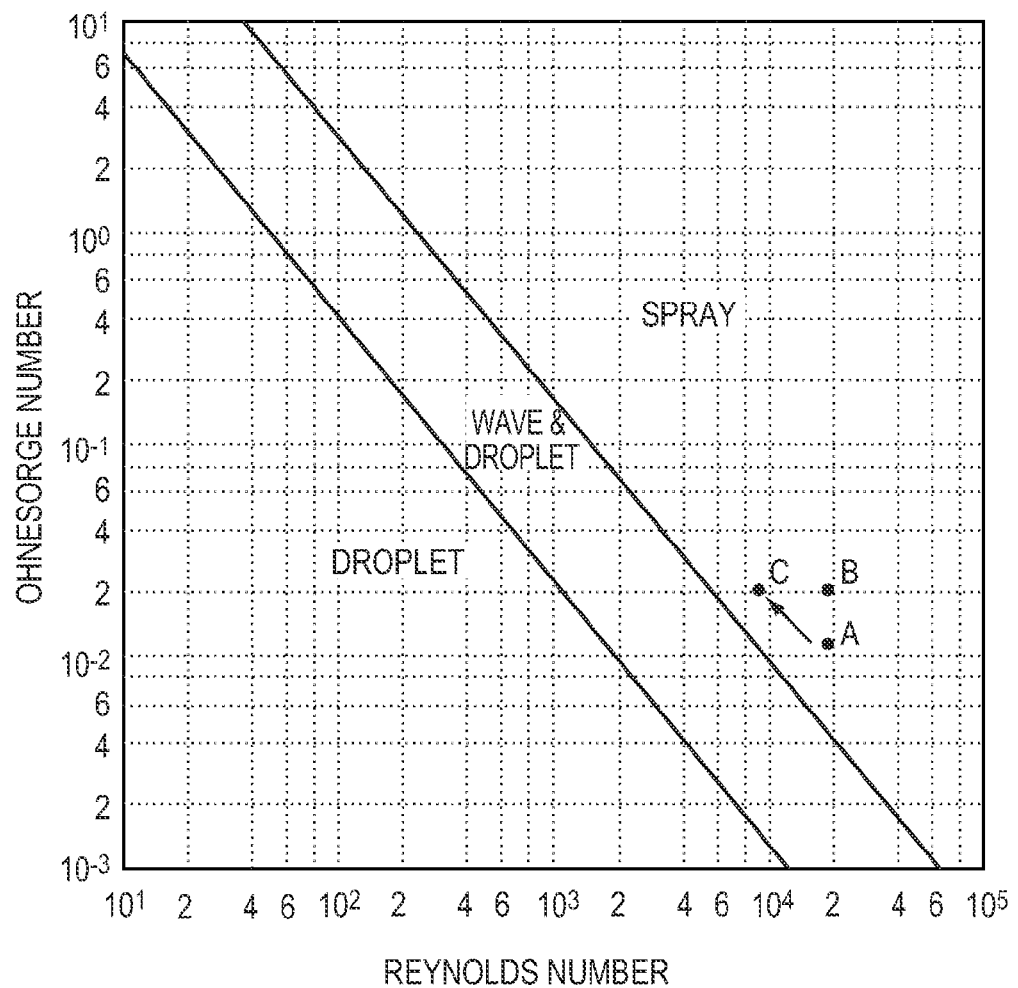
FIG. 6 is a chart showing the relationship of liquid-flow breakup to two dimensionless constants, with three operating points indicated.

FIG. 6 depicts the chart of FIG. 5 showing operating states A (FIG. 4A) and B (FIG. 5) for clarity, as well as a third operating state (C) that is achieved after adding a surfactant to operating state A and reducing the liquid injection velocity by a factor of two. In operating states A and B the Reynolds number is approximately $2 \times 10^4$; in operating state C, it is approximately $1 \times 10^4$. All three operating states or points (A, B, and C) are in the spray regime, but production of the spray in operating state C typically requires less power than in operating state A. An arrow indicates the movement of operating state from A to C that is influenced by simultaneously reducing the surface tension of the liquid by a factor of three and reducing the liquid injection velocity by a factor of two. As evident from FIG. 6, reduction of the injection velocity by a factor of two from operating state A (i.e., horizontal movement to the left to a Reynolds number of approximately $1 \times 10^4$, Ohnesorge number of approximately $1 \times 10^{-2}$) without reducing the surface tension of the liquid would not have allowed continued reliable operation in the spray regime.

Reductions in required heat-transfer fluid injection power may manifest as the ability to achieve similar spray quality (i.e., atomization) at lower pumping powers. For example, if 250 gpm of atomized water flow is utilized to achieve a desired rate of heat transfer within a 30 gallon cylinder compressing air from 250 to 3000 psig in approximately 1 second, that 250 gpm flow may be divided over a set of nozzles each with, e.g., a 10 psid pressure drop or a 20 psid pressure drop. In general, 10 psid pressure drop nozzles have a larger passage area and lower injection velocity. But with decreased surface tension of the heat-transfer fluid, atomization may still occur. For example, dividing the above 250 gpm flow rate through a set of nozzles with total equivalent orifice area of 2.4 $in^2$ and approximate injection velocity of 33 ft/s, may result in a 10 psid pressure drop across the nozzle. Atomization may not occur for such an arrangement with a high-surface-tension fluid, but may occur with a fluid with lower surface tension. To achieve atomization with a high-surface-tension fluid (e.g., substantially pure water), the 250 gpm flow may be divided among a set of nozzles with a total equivalent orifice area of 1.72 $in^2$ and approximate injection velocity of 47 ft/s, which may result in a 20 psid pressure drop across the nozzle, essentially doubling the required pumping power.

Also referring back to FIG. 3, control system 305 may control the injection velocity of spray 336 from spray mechanism 334 based on, e.g., the surface tension of the heat-transfer fluid 328 and/or the type of spray being produced by spray mechanism 334 (e.g., one of the types illustrated in FIG. 4B). For example, control system 305 may reduce the injection velocity of spray 336 to approximately the minimum speed at which an atomized spray 336 results, and/or may make other adjustments to the injection velocity as desired (e.g., in response to variations in the concentration of an additive in heat-transfer fluid 328 or such variations among batches of heat-transfer fluid 328). Control system 305 may be responsive to a sensor disposed in or on cylinder assembly 302 (or in heat-transfer subsystem 304) for measuring the chemical and/or physical properties (e.g., surface tension, chemical composition, etc.) of the heat-transfer fluid within cylinder assembly 302 (and/or portions of heat-transfer subsystem 304).

The solutes, additives, and/or surfactants utilized in various embodiments of the invention may also be selected to have (and/or utilized in conjunction with another additive that has) other advantageous properties. For example, such substances may also retard or prevent corrosion, enhance lubricity, and/or prevent formation of or kill microorganisms such as bacteria.

Generally, the systems described herein may be operated in both an expansion mode and in the reverse compression mode as part of a full-cycle energy storage system with high efficiency. For example, the systems may be operated as both compressor and expander, storing electricity in the form of the potential energy of compressed gas and producing electricity from the potential energy of compressed gas. Alternatively, the systems may be operated independently as compressors or expanders.

In addition, the systems described above, and/or other embodiments employing liquid-spray heat exchange or external gas heat exchange (as detailed above), may draw or deliver thermal energy via their heat-exchange mechanisms to external systems (not shown) for purposes of cogeneration, as described in the '513 application.

The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A method for improving efficiency of a compressed-gas energy storage and recovery system, the method comprising:
   providing a heat-transfer fluid comprising an additive therein for at least one of (i) reducing a surface tension of the heat-transfer fluid or (ii) enhancing a lubricity of the heat-transfer fluid;
   at least one of (i) compressing gas to store energy or (ii) expanding gas to recover energy; and
   thereduring, exchanging heat between the gas and the additive-containing heat-transfer fluid, thereby increasing efficiency of the energy storage and recovery,
   wherein the heat exchange between the additive-containing heat-transfer fluid and the gas renders the at least one of compression or expansion of the gas substantially isothermal.

2. The method of claim 1, wherein (i) energy stored during compression of the gas originates from an intermittent renewable energy source of wind or solar energy, and (ii) energy is recovered via expansion of the gas when the intermittent renewable energy source is nonfunctional.

3. The method of claim 1, further comprising at least one of (i) venting expanded gas to atmosphere or (ii) storing compressed gas in a compressed-gas reservoir.

4. The method of claim 1, further comprising heating the additive-containing heat-transfer fluid to reduce a solubility of the gas in the heat-transfer fluid.

5. The method of claim 1, wherein the additive comprises a surfactant.

6. The method of claim 5, wherein the surfactant comprises at least one of sodium dodecyl sulphate, iso-amyl alcohol, or sodium tetradecyl sulphate.

7. The method of claim 1, wherein the additive at least one of (i) retards or prevents corrosion, (ii) prevents formation of or kills microorganisms, or (iii) comprises a defoaming agent.

8. The method of claim 1, further comprising at least one of (i) prior to the at least one of expansion or compression, introducing gas into a cylinder assembly substantially isobarically, wherein heat is not exchanged between the gas and the additive-containing heat-transfer fluid thereduring, or (ii) after the at least one of expansion or compression, exhausting gas from a cylinder assembly substantially isobarically, wherein heat is not exchanged between the gas and the additive-containing heat-transfer fluid thereduring.

9. A method for improving efficiency of a compressed-gas energy storage and recovery system, the method comprising:
   providing a heat-transfer fluid comprising an additive therein for at least one of (i) reducing a surface tension of the heat-transfer fluid or (ii) enhancing a lubricity of the heat-transfer fluid;
   at least one of (i) compressing gas to store energy or (ii) expanding gas to recover energy; and
   thereduring, exchanging heat between the gas and the additive-containing heat-transfer fluid, thereby increasing efficiency of the energy storage and recovery,
   wherein exchanging heat between the gas and the additive-containing heat-transfer fluid comprises spraying the additive-containing heat-transfer fluid into the gas, an injection velocity of the spraying being less than an injection velocity required to form a spray from the heat-transfer fluid without the additive.

10. A compressed-gas energy storage and recovery system comprising:
    a cylinder assembly for compressing gas to store energy and expanding gas to recover energy, the cylinder assembly comprising two separated chambers;
    a spray mechanism for introducing a spray of heat-transfer fluid within the cylinder assembly to exchange heat with gas therein, thereby increasing efficiency of the energy storage and recovery; and
    a control system for controlling a velocity of the spray based at least in part on a surface tension of the heat-transfer fluid.

11. The system of claim 10, wherein the control system controls the cylinder assembly and the spray mechanism to enforce substantially isothermal compression and expansion of gas in the cylinder assembly.

12. The system of claim 10, further comprising, selectively fluidly connected to the cylinder assembly, (i) a compressed-gas reservoir for storage of gas after compression and supply of compressed gas for expansion thereof, and (ii) a vent for exhausting expanded gas to atmosphere and supply of gas for compression thereof.

13. The system of claim 10, wherein the spray mechanism comprises at least one of a spray head or a spray rod.

14. The system of claim 10, further comprising a circulation apparatus for circulating the heat-transfer fluid to the spray mechanism.

15. The system of claim 14, further comprising a heat exchanger for maintaining the heat-transfer fluid at a substantially constant temperature, wherein the circulation apparatus circulates heat-transfer fluid from the cylinder assembly through the heat exchanger and back to the cylinder assembly.

16. The system of claim 10, further comprising:
    (i) a movable boundary mechanism separating the two chambers, and
    (ii) a crankshaft, mechanically coupled to the boundary mechanism, for converting reciprocal motion of the boundary mechanism into rotary motion.

17. The system of claim 10, further comprising a heat-transfer fluid for spraying through the spray mechanism, the heat-transfer fluid comprising an additive for reducing a surface tension thereof.

18. The system of claim 17, wherein the additive comprises a surfactant.

19. The system of claim 18, wherein the surfactant comprises at least one of sodium dodecyl sulphate, iso-amyl alcohol, or sodium tetradecyl sulphate.

* * * * *